United States Patent

Suzuki et al.

[11] Patent Number: 5,914,470
[45] Date of Patent: *Jun. 22, 1999

[54] ACCELERATION DETECTING DEVICE

[75] Inventors: Kyojiro Suzuki, Kariya; Keiji Nagura, Okazaki; Sadayuki Kuwahara, Bisai, all of Japan

[73] Assignee: Denso Corporation, Kariya, Japan

[ * ] Notice: This patent is subject to a terminal disclaimer.

[21] Appl. No.: 08/853,490

[22] Filed: May 8, 1997

Related U.S. Application Data

[63] Continuation-in-part of application No. 08/496,199, Jun. 28, 1995, Pat. No. 5,721,407.

[30] Foreign Application Priority Data

| Jun. 29, 1994 | [JP] | Japan | 6-172138 |
| Dec. 12, 1994 | [JP] | Japan | 6-332627 |
| Jan. 25, 1995 | [JP] | Japan | 7-030073 |
| Feb. 19, 1995 | [JP] | Japan | 7-035411 |
| Mar. 19, 1995 | [JP] | Japan | 7-042058 |
| Mar. 24, 1995 | [JP] | Japan | 7-091861 |
| May 10, 1996 | [JP] | Japan | 8-140968 |

[51] Int. Cl.$^6$ ................................ H01H 35/14
[52] U.S. Cl. ................ 200/61.45 R; 200/61.48
[58] Field of Search ............... 73/1.37–1.39, 73/488, 514.01, 514.14, 514.36, 514.33, 514.38; 200/61.45 R–61.45 M; 280/735; 307/10.1

[56] References Cited

U.S. PATENT DOCUMENTS

| 3,654,410 | 4/1972 | Miller | 200/61.45 R |
| 3,715,535 | 2/1973 | Urenda | 200/61.53 |
| 3,961,145 | 6/1976 | Halbeck | 200/155 A |
| 4,188,517 | 2/1980 | Narita et al. | 200/61.45 R |
| 4,362,913 | 12/1982 | Kumita et al. | 200/61.45 R |
| 4,496,809 | 1/1985 | Faust et al. | 200/61.45 R |
| 4,980,526 | 12/1990 | Reneau | 200/61.45 M |
| 5,005,861 | 4/1991 | Breed et al. | 280/734 |
| 5,012,050 | 4/1991 | Sewell | 200/61.45 R |
| 5,034,580 | 7/1991 | Tada et al. | 200/61.45 R |
| 5,059,751 | 10/1991 | Woodman et al. | 200/61.45 M |
| 5,178,410 | 1/1993 | Thuen et al. | 280/734 |
| 5,192,838 | 3/1993 | Breed et al. | 200/61.45 R |
| 5,233,141 | 8/1993 | Breed | 200/61.45 R |
| 5,393,944 | 2/1995 | Manandhar et al. | 200/61.45 R |
| 5,477,428 | 12/1995 | Brown et al. | 362/80 |

FOREIGN PATENT DOCUMENTS

| 2-168525 | 6/1990 | Japan | H01H 33/14 |

*Primary Examiner*—Michael A. Friedhofer
*Attorney, Agent, or Firm*—Pillsbury Madison & Sutro LLP

[57] ABSTRACT

When an acceleration more than a predetermined level is applied to a weight, a rotational moment is applied to a center of gravity of the weight, and therefore, the weight rotates around a shaft as a rotational center in a direction to be opposite to an elastic force given by plate springs. At this time, a rotor rotates in accordance with the rotation of the weight, the plate springs contacting respectively first cam and second cam move so as to narrow the clearance between the plate springs. When the rotor is rotated to a predetermined angle, contact points of the plate springs contact, and the contact state can be detected as an acceleration detecting signal through signal-output terminals. A stopper has two ends, and the two end are fixed to a cover to have a clearance portion between the cover and the stopper. When the weight and the stopper contact, the stopper is bent to the clearance portion side to absorb a shock due to the rotation of the weight.

10 Claims, 27 Drawing Sheets

FIG.27A
FIG.27B
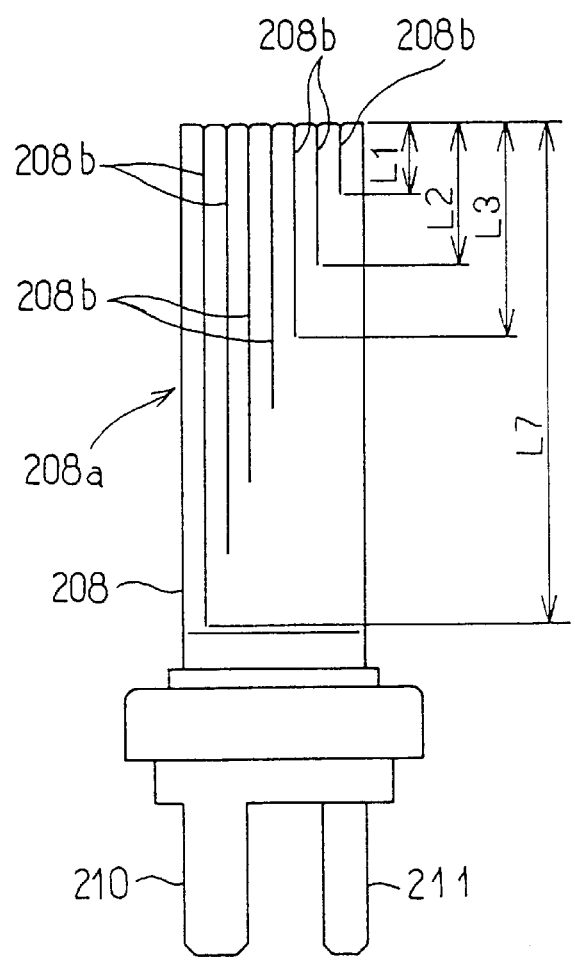
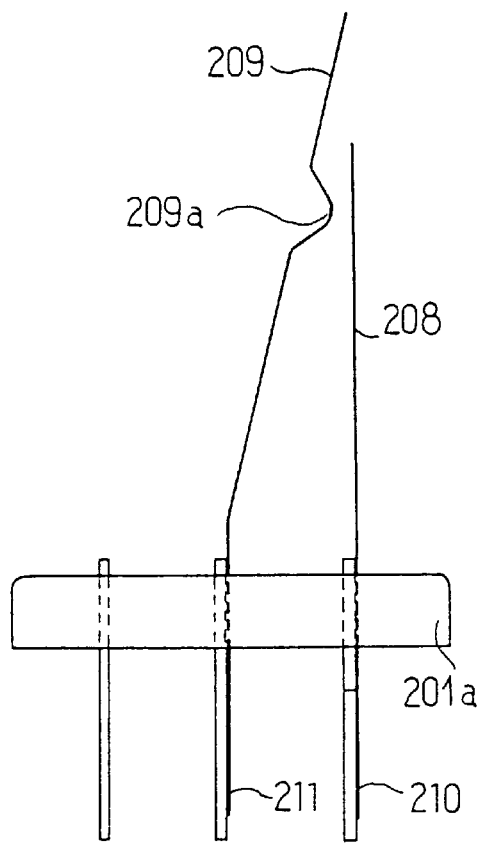

- IGNITION AND MONITOR CIRCUITS
- DIAGNOSIS REGISTER (ECU SIDE)
- IGNITION AND MONITOR CIRCUITS

ACCELERATION DETECTING DEVICE

This is a continuation-in-part of: National Application No. 08/496,199 filed Jun. 28, 1995 now U.S. Pat. No. 5,721,407.

CROSS REFERENCE TO RELATED APPLICATIONS

This application is related to and claims priorities from Japanese Patent Applications No. 6-172138 filed on Jun. 29, 1994, No. 6-332627 filed on Dec. 12, 1994, No. 7-30073 filed on Jan. 25, 1995, No. 7-35411 filed on Feb. 23, 1995, No. 7-42058 filed on Mar. 1, 1995, No. 7-91861 filed on Mar. 24, 1995, No. 7-96309 filed on Mar. 28, 1995, and No. 8-140968 filed on May 10, 1996, the contents of which are hereby incorporated by reference.

BACKGROUND OF THE INVENTION

1. Field of the Invention

This invention relates to an acceleration detecting device which is a device to detect acceleration of an object and that is favorable for sensing collision of a vehicle and causing to activate a passenger protection apparatus such as an airbag and a seat belt.

2. Related Art

Conventionally, a device which mechanically assesses acceleration information by a rotor with a weight center of gravity and rotational center caused to be eccentric and makes output to an external portion as an electrical signal by a contact which rotates integrally with the rotor, as seen in Japanese Patent Application Laid-open No. 2-168525 Patent Gazette, is known as one device of this type. In this case, a single function is assigned to every one part: the rotor rotates due to the action of acceleration, a spring urges the rotor to prevent operation at times other than acceleration action, and the contact performs relaying to output the rotation of the rotor as an electrical signal.

However, assigning a single function to every one part causes the number of parts to increase, and mechanical connections also increase. Additionally, assurance of the spacing of contact points is structurally difficult, and so there exist problems of a lack of stability in quality, and an inability to make the acceleration detecting device compact and lightweight.

Additionally, in a case where an acceleration detecting device is applied in an airbag apparatus, it is necessary to send signals to the driver seat side, passenger seat side, and the like, and so a plurality of independent electrical signals may be output in some cases. There exists two possible methods for this: dividing the acquired electrical signal as the first method, and using two or more devices as a second method. However, the first method requires a transistor and constant-current circuit in an accessory system, resulting in complexity and high cost, and with the second method, cost is not only increased by two times or more, but it is difficult to obtain electrical signals having identical characteristics; problems exist with either method.

In addition, in a case where a casing of an acceleration detecting device is formed with resin material, assembly performance during press-fitting is poor, and in particular, there exists the problem wherein damage such as splitting of the cover occurs in a case of press-fitting with the cover remaining tilted.

SUMMARY OF THE INVENTION

Consequently, it is an object of the present invention to provide an acceleration detecting device which reduces a number of parts and reduces mechanical connections by assigning a plurality of functions to a single part and thereby makes a compact and lightweight acceleration detecting device possible.

It is another object of the present invention to provide an acceleration detecting device, which improves a damper effect of a stopper, prevents chattering between contact points, and provides a stable acceleration detecting signal.

To solve the above-described problems, an acceleration detecting device according to the present invention comprises a weight to rotate in correspondence with acceleration, a shaft which is fixed to the weight and becomes a rotational center when the weight rotates, a rotor which includes a cam portion and is supported in the shaft to rotate integrally with the weight, a pair of plate springs of which a contact state changes in an actuating state when the rotor rotates by a predetermined angle, a housing for fixing the shaft and the pair of plate springs, a cover installed on the housing for covering the shaft and the pair of plate springs fixed to the housing and a shock-reducing member for regulating a further rotation of the weight after the contact state of the plate springs becomes in the actuating state and for elongating the actuating state, which is fixed to at least one of the housing and the cover and is disposed in a rotation passage of the weight to absorb the shock due to a rotational energy of the weight.

According to the above-described structure, when a predetermined acceleration is applied to the weight so that the rotation angle of the weight becomes more than a predetermined angle, the rotor rotates with the weight, and the contact state of the plate springs changes. That is, the plate springs close the contact points when it is in a normally opened state, and the plate springs open the contact points when it is in a normally closed state.

The shock-reducing member is disposed in the rotational passage of the weight to regulate a further rotation of the weight and to elongate the actuating state after the contact state of the plate springs becomes in the actuating state. Further, the shock reducing member is fixed to at least one of the cover and the housing. When the shock-reducing member contacts the weight, the shock-reducing member absorbs the rotation energy of the weight. Thus, the shock-reducing member is operated as a damper, and absorbs the shock due to the rotation of the weight. As a result, it can prevent the chattering between the contact points of the plate springs, a time period of maintaining the actuating state of the plate spring can be made longer, and a stable acceleration detecting signal can be provided.

Preferably, the shock-reducing member is made of elastic material such as resin or rubber, or is composed of a coil spring or a plate spring. Further, a space for bending the shock-reducing member may be formed between the cover and the shock-reducing member.

The pair of plate springs respectively have tip portions, at least one of the tip portions of the plate springs may contact the cam portion of the rotor for urging the rotor in a direction opposite to a direction of rotation of the rotor. The contact state becomes in the actuating state by the rotation of the rotor when a predetermined acceleration is applied to the weight. More preferably, the cam portion of the rotor includes a first cam portion and a second cam portion, the first and second plate springs contact the first cam portion and the second cam portion, respectively. The first and second cam portions are formed to contact the first plate spring and second plate spring when the predetermined acceleration is applied to the weight. When the acceleration detecting device is mounted on a vehicle to detect acceleration corresponding to a vehicle collision, the weight and the rotor are not rotated by a slight acceleration caused by a quick brake of the vehicle or by traveling of the vehicle on a bumpy road.

The weight may have a hole formed thereon, and the hole may penetrate therethrough. By forming the hole in the weight, a center of gravity of the weight is easily regulated. Thus, a sensibility characteristic of the acceleration detecting device can be changed without changing the shape of the weight.

BRIEF DESCRIPTION OF THE DRAWINGS

Additional objects and advantages of the present invention will be more readily apparent from the following detailed description of preferred embodiments when taken together with the accompanying drawings, in which:

FIG. 27A is a front structural diagram indicating plate springs installed on a base, and FIG. 27B is a left-hand structural diagram indicating the plate springs;

FIGS. 38A and 35B are a front-section view and a side-sectional view, respectively, indicating the acceleration detecting device according to the sixteenth embodiment in which an acceleration more than a predetermined level is applied;

DETAILED DESCRIPTION OF THE PREFERRED EMBODIMENTS

The present invention will be described hereinafter with reference to specific embodiments.

Figure 1:
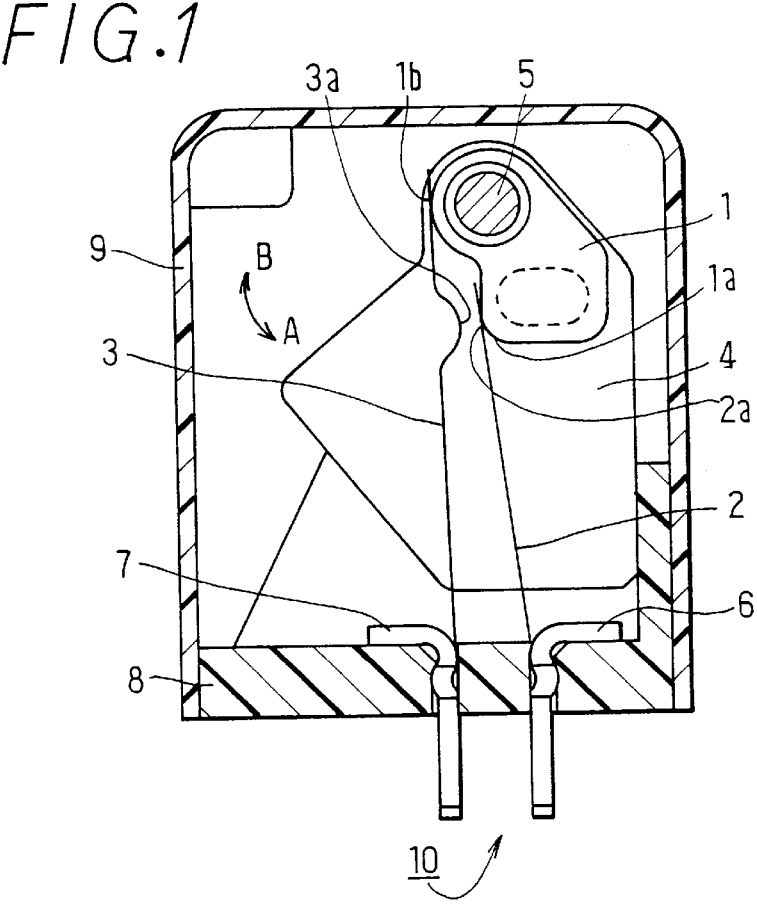
FIG. 1 is a front view indicating a structure of an acceleration detecting device according to a first embodiment of the present invention.
Figure 2:
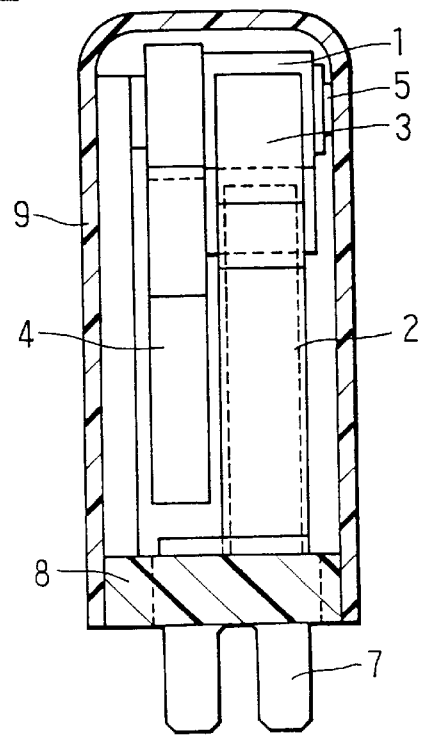
FIG. 2 is a left-hand view indicating a structure of an acceleration detecting device according to the first embodiment of the present invention.
Figure 3:
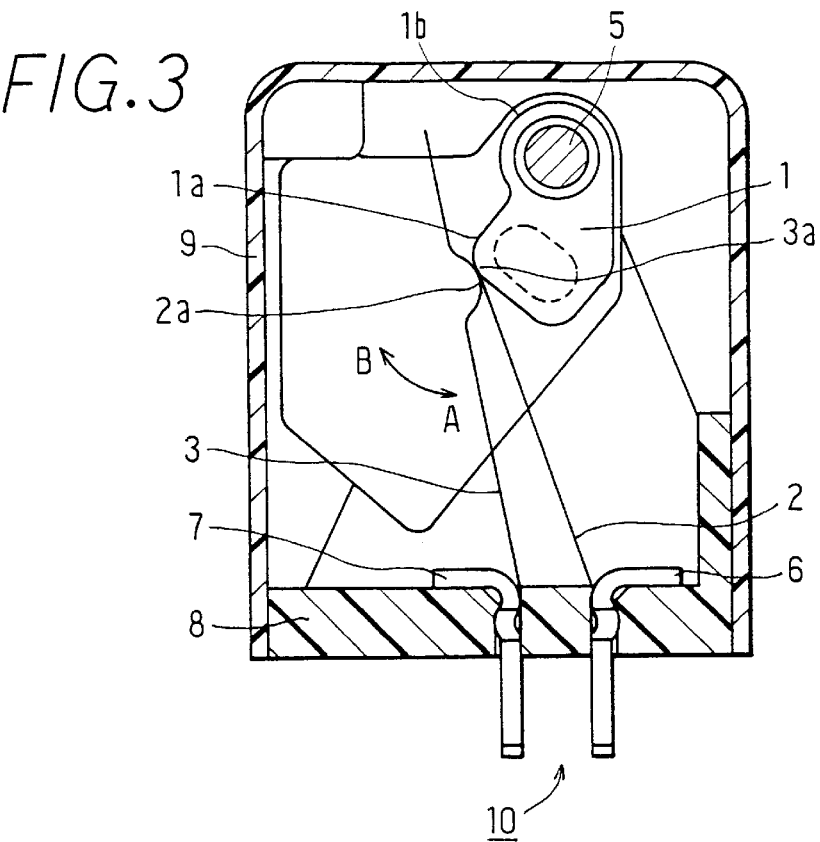
FIG. 3 is a front view indicating an operating state of an acceleration detecting device according to the first embodiment of the present invention.

FIG. 1 is a front view indicating a structure of an acceleration detecting device 10 according to the present embodiment. FIG. 2 is a left-hand view of FIG. 1. FIG. 3 is a front view of a state wherein the acceleration detecting device 10 has detected acceleration and been actuated.

The acceleration detecting device 10 is structured from a shaft 5; a weight 4 where a center of gravity and rotational center are not co-axial and which rotates around the shaft 5 during acceleration detection; a rotor 1 on which a first cam 1a and a second cam 1b are formed, is fixed on the weight 4, has a rotational axis identical to the weight 4, and rotates integrally with the weight 4 during acceleration detection; a plate spring 2 and a plate spring 3 which are a pair of plate springs having a contact point 2a and a contact point 3a and which respectively contact the first cam surface and second cam surface and urge the rotor 1 in a direction opposite to a direction of rotation during acceleration detection; a plate 6 and a plate 7 which respectively contact the plate spring 2 and plate spring 3 and output an electrical signal to an external portion during contact of the contact point 2a and contact point 3a; a housing which fixedly disposes the shaft 5, plate 6, and plate 7; and a cover 9 to protect the device.

The housing 8 is made of synthetic resin or the like, and a groove is formed on a lower area to fix the plate 6 of metal fabrication and the plate spring 2 of metal fabrication as well as the plate 7 of metal fabrication and the plate spring 3 of metal fabrication. The plate 6 and plate spring 2 and the plate 7 and plate spring 3 may be formed inserted into the housing 8. Additionally, bearings are formed on an upper portion of the housing 8, and the shaft 5 of metal fabrication is press-fitted and fixed in the bearings.

The plate spring 2 and plate spring 3 both have an upper tip portion functioning as a contact-point, i.e., are respectively provided with a contact point 2a and contact point 3a. In particular, the contact point 3a is made to have a protruding configuration to make the contact-point function effective. The plate spring 2 contacts the plate 6 and the plate spring 3 contacts the plate 7, and both are fixed to the housing 8. Contact of the contact point 2a and the contact point 3a is detected by electrical signals due to change in resistance between the plate 6 and the plate 7. The electrical signals may be output directly from the plate spring 2 and the plate spring 3.

The shaft 5 supports the weight 4 of metal fabrication and the rotor 1 of nonmetal fabrication which has a rotational axis identical to the weight 4, and rotates integrally with the weight 4.

Because a shaft hole is provided configurationally on a peripheral portion, the weight 4 has an eccentric center of gravity and rotational center, and when subjected to deceleration, a moment is applied to the center of gravity, and the weight 4 rotates around the shaft 5.

The first cam 1a of noncircular configuration and the second cam 1b of semicircular configuration are formed on the rotor 1 of nonmetal fabrication. The tip portion of the plate spring 2 contacts the first cam 1a and the tip portion of the plate spring 3 contacts the second cam 1b, and constantly urge the rotor 1 in a direction opposite to the direction of rotation during acceleration detection. For this reason, when the acceleration detecting device is mounted on a vehicle to detect acceleration corresponding to a vehicle collision, the rotor 1 does not move even if subjected to slight deceleration during traveling of a vehicle.

Displacement of the contact point 2a of the plate spring 2 due to the first cam 1a is greater than displacement of the contact point 3a of the plate spring 3 due to the second cam 1b, and so when the rotor 1 is rotated by being subject to acceleration, the gap between the contact point 2a and contact point 3a gradually narrows, and ultimately the contact point 2a of the plate spring 2 pressed by the first cam 1a contacts the contact point 3a of the plate spring 3 in the direction of rotation due to the pressing.

Additionally, because the gap between the first cam 1a and second cam 1b is adequate, the plate spring 2 and plate spring 3 constantly urge the rotor 1 in a direction A of FIG. 1 and so the gap between the contact point 2a and contact point 3a is maintained with no fluctuation, and there is no contact due for example to vehicle vibration or the like except when a predetermined acceleration has been detected.

The cover 9 of synthetic resin is fixed to the housing 8 by press-fitting, and is also made to function as a stopper so that the weight 4 does not rotate excessively during acceleration detection.

Because the center of gravity and rotational center of the weight 4 are eccentric, deceleration (negative acceleration) is produced in a case where a vehicle or the like suddenly arrives at a stop from a traveling state, as during a collision, and a moment occurs in the center of gravity due to the law of inertia, and so the weight 4 rotates with the shaft 5 as the center during application of acceleration.

Due to rotation of the weight 4, the rotor 1 fixed on the weight 4 and having the same shaft 5 as the weight rotates integrally with the weight 4.

Because the plate spring 2 contacts the tip portion of the first cam 1a and the plate spring 3 contacts the tip portion of the second cam 1b at this time, they are respectively displaced together with rotation of the rotor 1. At this time, the amount of displacement due to the first cam 1a is larger, and so the gap between the contact point 2a of the plate spring 2 and the contact point 3a of the plate spring 3 narrows, and ultimately the contact point 2a of the plate spring 2 pressed by the first cam 1a contacts the contact point 3a of the plate spring 3 in the direction of rotation due to the pressing.

This contacting state of the contact point 2a and contact point 3a is output as an electrical signal via the plate spring 2 and the plate spring 3 and via the plate 6 and the plate 7 to an external portion, application of acceleration of a predetermined value or more is detected.

Additionally, the plate spring 2 and the plate spring 3 urge the rotor 1 in a direction A of FIG. 1, which is direction opposite to the rotational direction of the rotor 1 during acceleration detection, by their respective tip portions. For this reason, reacting of the weight 4 during slight deceleration occurring during normal travel which does not reach the vehicle collision can be blocked through the rotor 1, and detection of other than the vehicle collision can be prevented. Furthermore, the respective tip portions of the plate spring 2 and the plate spring 3 are in contact with the first cam 1a and second cam 1b and the gap between the first cam 1a and second cam 1b is sufficient, and so the gaps of the contact points can be adequately ensured, and erroneous detection can be prevented with no fluctuation in the positions of the contact point 2a and contact point 3a due to vibration or the like.

A second embodiment will be described next with reference to FIG. 4.

Figure 4:
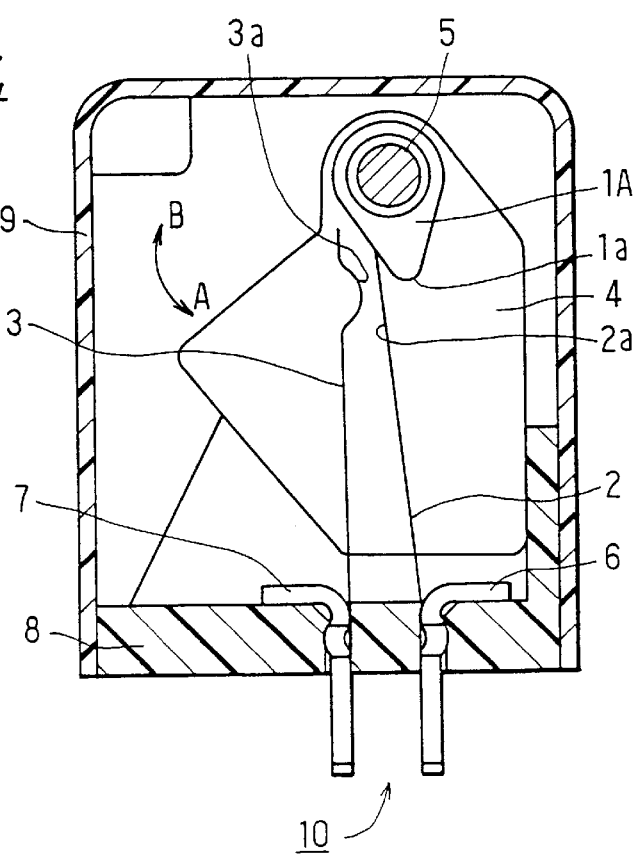
FIG. 4 is a front view indicating a structure of an acceleration detecting device according to a second embodiment of the present invention, which has a rotor of single-cam structure.

FIG. 4 is a front view of a second embodiment where a rotor has a single-cam structure by causing one of a pair of plate springs to urge the rotor in a direction opposite to a rotational direction thereof during acceleration detection.

A rotor 1A has a single-cam structure and a tip portion of a plate spring 2 urges a cam 1a. A plate spring 3 does not contact the rotor 1. Support by a housing 8, cover 9, or the like so that a tip portion of the plate spring 3 does not fluctuate due to vibration or the like during traveling is also acceptable.

In this case, the tip portion of the plate spring 3 is not displaced due to rotation of the rotor 1, but the tip portion of the plate spring 2 is displaced by action of the cam 1a in direction B of FIG. 4, which is the direction of rotation, the gap between a contact point 2a of the plate spring 2 and a contact point 3a of the plate spring 3 narrows, and ultimately contact is reached by the contact point 2a of the plate spring 2 pressing the contact point 3a of the plate spring 3 in direction B. Accordingly, the contacting state between the contact points is output as an electrical signal to an external portion via a plate 6 and a plate 7. The electrical signal may be output directly from the plate spring 2 and the plate spring 3.

To continue, a third embodiment will be described with reference to FIGS. 5 and 6.

Figure 5:
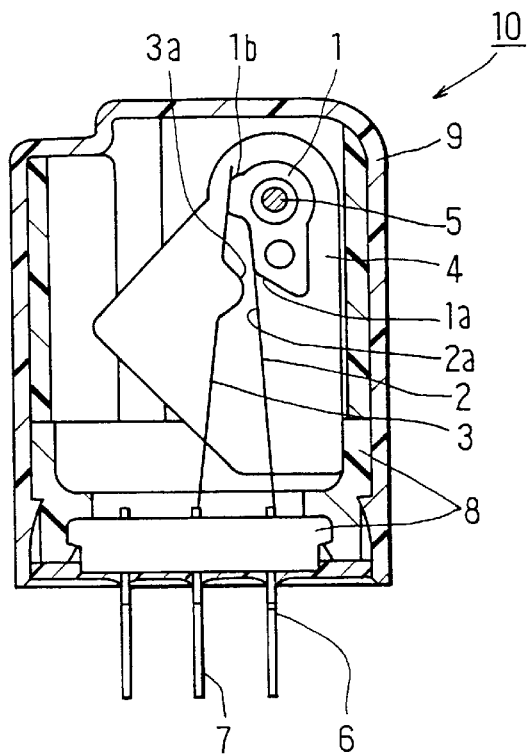
FIG. 5 is a front view of an acceleration detecting device according to a third embodiment of the present invention, indicating a structure of an acceleration detecting device having a first cam of a configuration which reduces contact-point displacement against rotation of a rotor after contact-point contact.

FIG. 5 is a front view indicating the structure of a third embodiment according to the present invention.

The present embodiment, similarly to the first embodiment, has a double-cam structure forming a first cam 1a and second cam 1b on a rotor 1; the difference between the first embodiment and the third embodiment lies in the configuration of the first cam 1a.

Namely, according to the first embodiment the first cam 1a is configured so that displacement of the contact point 2a of the plate spring 2 increases linearly along with rotation of the rotor 1. According to the present embodiment, however, the first cam 1a is configured to reduce displacement of a contact point 2a along with rotation of the rotor 1 after contact of the contact point 2a and a contact point 3a.

Figure 6:
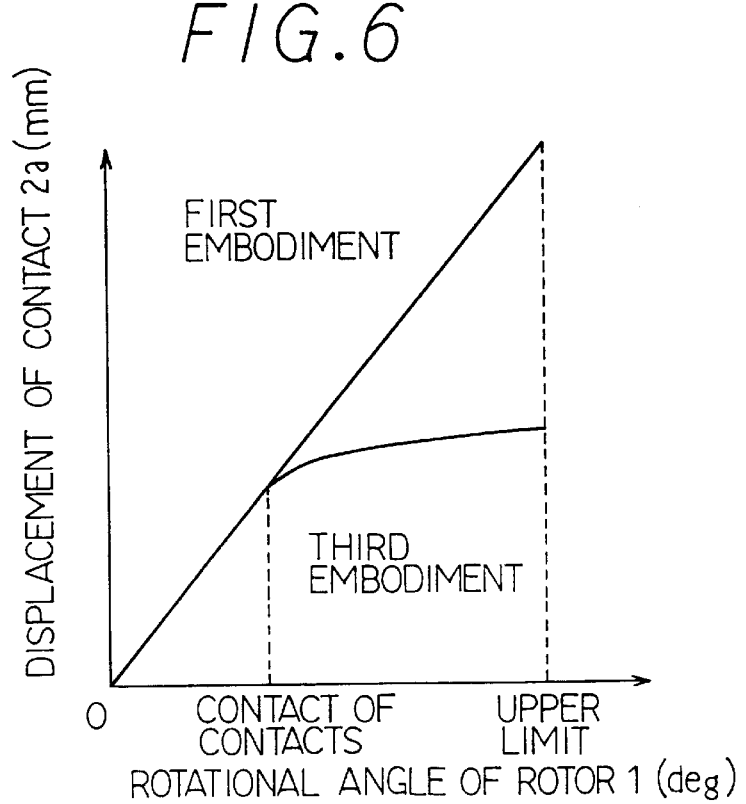
FIG. 6 is a graph indicating a relationship between amount of rotor rotation and contact-point displacement in an acceleration detecting device according to the third embodiment of the present invention.

FIG. 6 indicates a relationship between a rotational angle (de) of the rotor 1 and a amount of displacement of the contact point 2a of the plate spring 2 in the first embodiment and the present embodiment. According to the first embodiment, the amount of displacement of the contact point 2a increases linearly until the rotational upper limit of the rotor 1 is reached after contact of the contact point 2a and the contact point 3a, but according to the present embodiment, the amount of displacement of the contact point 2a is small after contact of the contact point 2a and the contact point 3a.

Consequently, by adopting the above-described structure the amount of displacement of the contact point 2a is small after contact of the contact point 2a and the contact point 3a, and so there is no great flexing of the plate spring 2 and plate spring 3. Accordingly, because spring fatigue accompanying flexing does not occur, the activation level of the acceleration detecting device 10 due to deceleration can be maintained at a uniform level, and stabilized characteristics of the acceleration detecting device 10 can be obtained.

Additionally, when the first cam 1a has a configuration as indicated in the first embodiment, the amount of displacement of the contact point 2a increases linearly, and so it was necessary to restrict the amount of rotation of the rotor 1 and weight 4 so that the elastic limit of the plate spring 2 and plate spring 3 is not exceeded. According to the present embodiment, however, the amount of displacement of the contact point 2a is small after contact of the contact point 2a and contact point 3a, and so a large amount of rotation of the rotor 1 and weight 4 can be obtained, and the flexibility of design can be improved.

A fourth embodiment will be described hereinafter with reference to FIG. 7.

Figure 7:
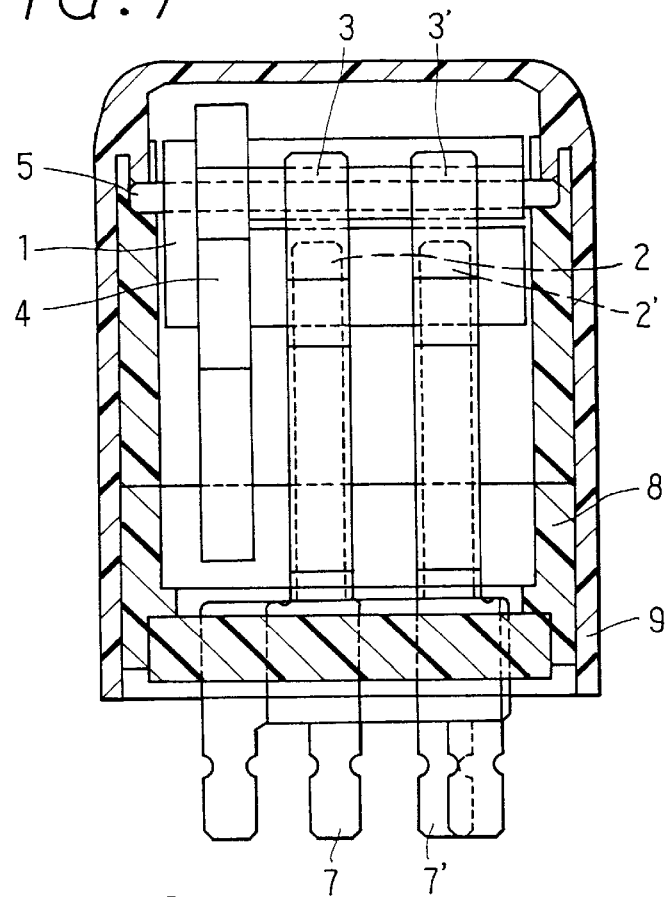
FIG. 7 is a front view indicating a structure of an acceleration detecting device according to a fourth embodiment of the present invention, which has two pairs of plate springs.
Figure 8:
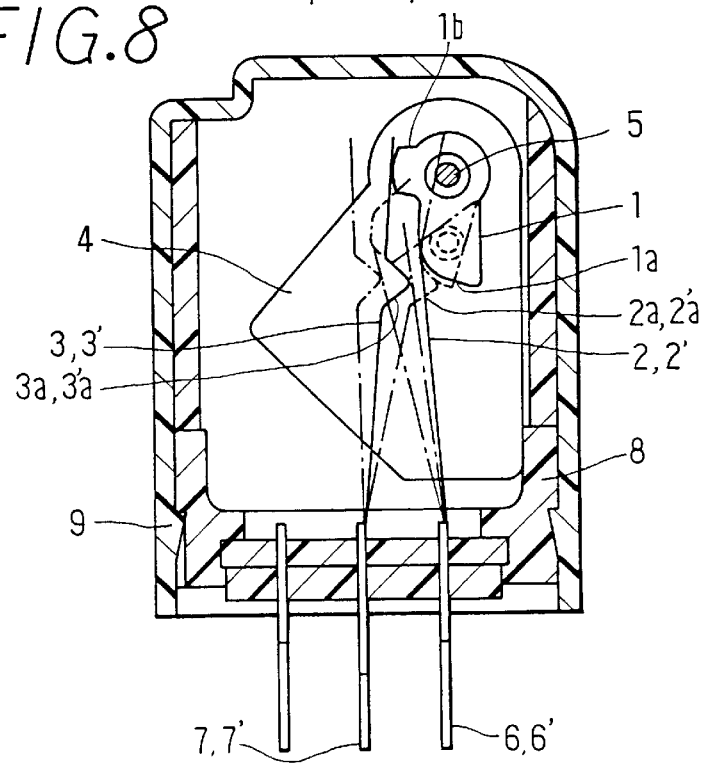
FIG. 8 is a right-hand view indicating a structure of an acceleration detecting device according to the fourth embodiment of the present invention, which has two pairs of plate springs.

FIG. 7 is a front view indicating the structure of a fourth embodiment, and FIG. 8 indicates a right-hand view thereof.

A differences with the third embodiment is the point that in addition to a plate spring 2 and plate spring 3, a plate spring 2' and plate spring 3' are provided, and in addition to a plate 6 and plate 7 to transmit a contacting state of the plate spring 2 and plate spring 3 to an external portion as an electric signals, a plate 6' and plate 7' to transmit a contacting state of the plate spring 2' and plate spring 3' to an external portion as an electric signals are disposed. A groove disposed on a lower area of a housing 8 is structured to be able to fix the plate spring 2' and plate spring 3' and the plate 6' and plate 7' in addition to the plate spring 2 and plate spring 3 and the plate 6 and plate 7.

The plate spring 2' and plate spring 3' as well as the plate 6' and plate 7' may have an insert formation in the housing 8.

The plate spring 2' and plate spring 3' are the same size and formed of the same material as the plate spring 2 and plate spring 3; a contact point 2'$a$ and contact point 3'$a$ are provided respectively on upper tip portions, and a gap between the contact point 2'$a$ and contact point 3'$a$ has a structure equivalent to a gap between the contact point 2$a$ and contact point 3$a$. In particular, the plate spring 3' and contact point 3'$a$ constitute a protruding configuration for effective contact-point functioning.

The plate spring 2' contacts the plate 6' and the plate spring 3' contacts the plate 7', and are fixed to the housing 8. Contact of the contact point 2'$a$ of the plate spring 2' and of the contact point 3'$a$ of the plate spring 3' is detected by an electrical signal due to change in resistance between the plates 6' and 7'. This electrical signal may be output directly from the plate springs 2' and 3'.

Tip portions of the plate springs 2 and 2' contact a first cam 1$a$ of noncircular configuration formed on a rotor 1 of nonmetal fabrication and tip portions of the plate springs 3 and 3' contact a second cam 1$b$ of semicircular configuration, constantly urging the rotor 1 in a direction opposite to a rotational direction thereof during acceleration detection. For this reason, the rotor 1 does not move even if subjected to slight deceleration during travel.

By action of acceleration of a predetermined value or more, a moment occurs in the center of gravity due to the law of inertia, and the weight 4 rotates with the shaft 5 as the center in resistance to urging force of the plate springs 2 and 2$a$' acting via the rotor 1, the rotor 1 fixed on the weight 4 rotates together with the weight 4.

The rotor 1 presses the plate springs 2 and 2' along with rotation and causes contact points 2$a$ and 2'$a$ of the plate springs 2 and 2' to be displaced, and thereby the gaps between the contact point 2$a$ and contact point 3$a$ and the contact point 2$a$' and contact point 3$a$, narrow, and ultimately make contact.

According to the present embodiment, two independent electrical signals or obtained by obtaining this contacting state as electrical signals. In particular, the plate springs 2' and 3' are of identical size to the plate springs 2 and 3 and are disposed in an identical state, and so the two pairs of contact points (contact point 2$a$ and contact point 3$a$, and contact point 2$a$' and contact point 3$a$') operating in the same phase, and the acquired all signals have little variation in response time and the like, and accordingly it is possible to obtain two independent electrical signals of identical characteristics.

Additionally, the increase in the number of parts is small in comparison with a case where two devices with a single pair of contact points are employed, and so it is possible to achieve two contact points at low cost.

A fifth embodiment will be described next with reference to FIG. 9.

Figure 9:
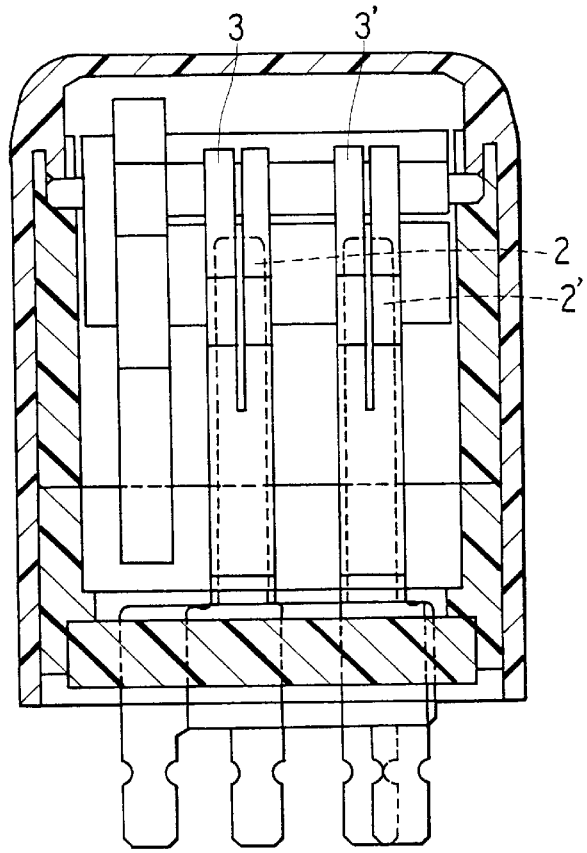
FIG. 9 is a front view indicating a structure of an acceleration detecting device according to a fifth embodiment of the present invention, which has two pairs of plate springs forming slits.

FIG. 9 is a front view indicating a structure of a fifth embodiment according to the present invention.

A difference between the fifth embodiment and the fourth embodiment is the point that whereas the fourth embodiment did not dispose slits with respect to the plate springs 2 and 2' and the plate springs 3 and 3', the fifth embodiment disposes slits with respect to plate springs 2 and 2' and plate springs 3 and 3'.

In a case where slits are provided, even if foreign matter adheres between respective contact points during contact times of contact points 2$a$ and 2$a$' and contact points 3$a$ and 3$a$', it is possible for one side divided by the slit to make contact, and so reliability of contact-point functioning is improved.

A sixth embodiment will be described hereinafter with reference to FIG. 10.

Figure 10:
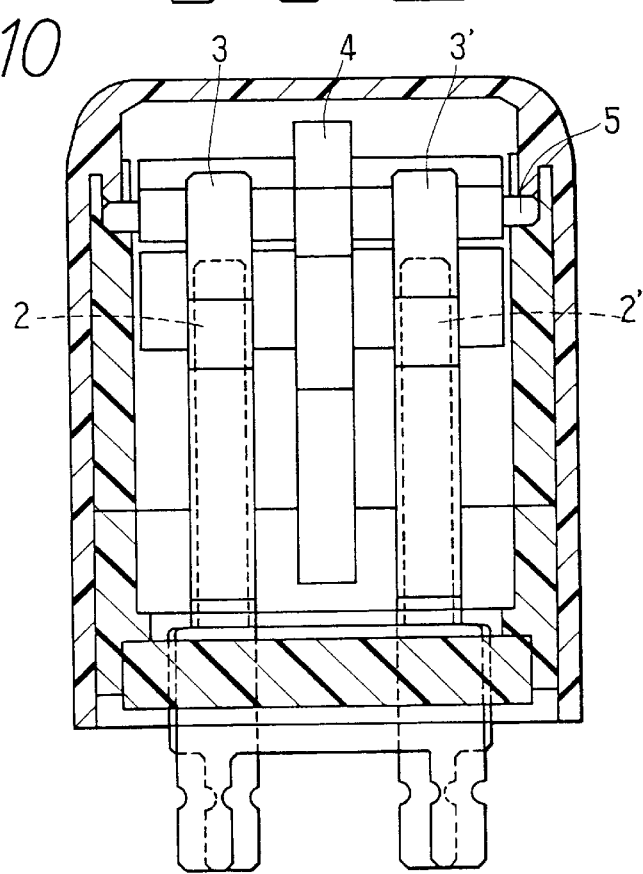
FIG. 10 is a front view indicating a structure of an acceleration detecting device according to a sixth embodiment of the present invention, which has two pairs of plate springs disposed on two sides of a weight.

FIG. 10 is a front view indicating a structure of a sixth embodiment according to the present invention.

A difference between the sixth embodiment and the fourth embodiment is the point that whereas the weight 4 was disposed at an end of the shaft 5 in the fourth embodiment, in the sixth embodiment a weight 4 is disposed in a center portion of a shaft 5, and plate springs 2 and 3 and plate springs 2' and 3' are disposed on both ends of the weight 4; operation is similar to the fourth embodiment.

The structure according to the present embodiment causes gaps between two pairs of contact points to be the same to acquire two independent electrical signals having identical characteristics, but a structure which provides differing contact gaps and can obtain signals of differing characteristics is also acceptable.

According to the above-described structure, the rotor 1 and weight 4 are structured as separate bodies, but integral formation of the rotor 1 and weight 4 is also acceptable.

Additionally, the shaft 5 was fixed to a housing 8, but it is also acceptable to fix the shaft 5 to a cover 9.

The structure utilized press-fitting as a method to fix the cover 9 to the housing 8, but performance by a method other than press-fitting is also acceptable.

The structure caused the rotor 1 to rotate around the shaft 5 with the rotor 1 and shaft 5 as separate bodies, but it is also acceptable to form the rotor 1 and shaft 5 integrally so that the shaft 5 rotates.

A seventh embodiment will be described hereinafter with reference to FIGS. 11 and 12.

Figure 11:
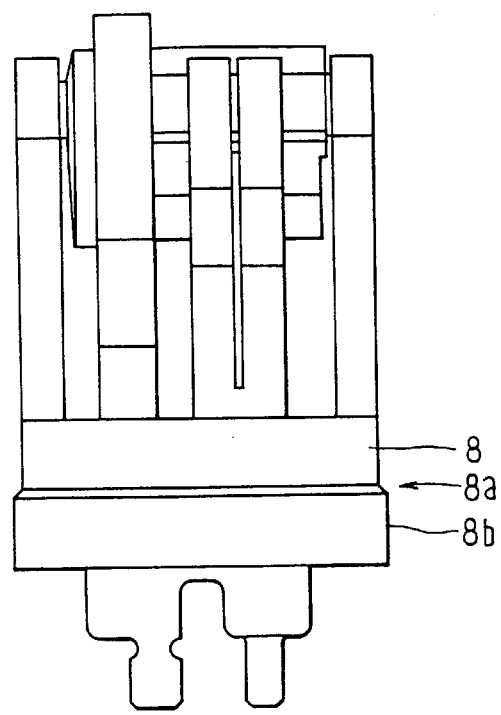
FIG. 11 is a structural diagram of an acceleration detecting device according to a seventh embodiment of the present invention, indicating a structure where an escape portion is formed on a housing.
Figure 12:
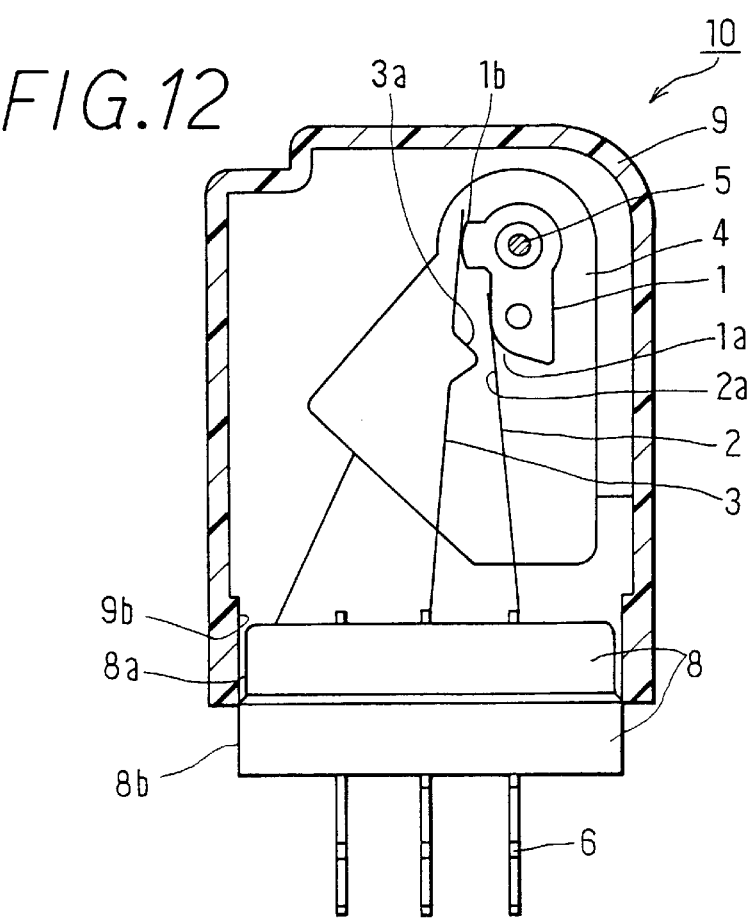
FIG. 12 is a right-hand view of an acceleration detecting device according to the seventh embodiment of the present invention, indicating a structure where an escape portion is formed on a housing and press-fitted into a cover.

FIG. 11 is a front view indicating a structure of a seventh embodiment according to the present invention except for a cover 9, and FIG. 12 is a right-hand view of the structure of the seventh embodiment according to the present invention.

A characteristic of the present embodiment is that in a case of forming a casing of an acceleration detecting device 10 by press-fitting a housing 8 to a cover 9, an escape portion 8$a$ (corresponding to a first mating portion) of a uniform outer peripheral configuration dimension which is smaller than an outer peripheral configuration dimension of a press-fit portion 8$b$ (corresponding to a second mating portion) of the housing 8 is provided on an upper portion of the press-fit portion 8$b$. Because of this, press-fitting of the housing 8 and cover 9 can be performed favorably.

When the housing 8 is caused to have a structure with no escape portion 8$a$, the configurational dimensions of the press-fit portions of the housing 8 and cover 9 are tight, and so provisional assembly of press-fitting of the housing 8 and cover 9 becomes unstable, and press-fitting cannot be performed favorably.

Figure 16:
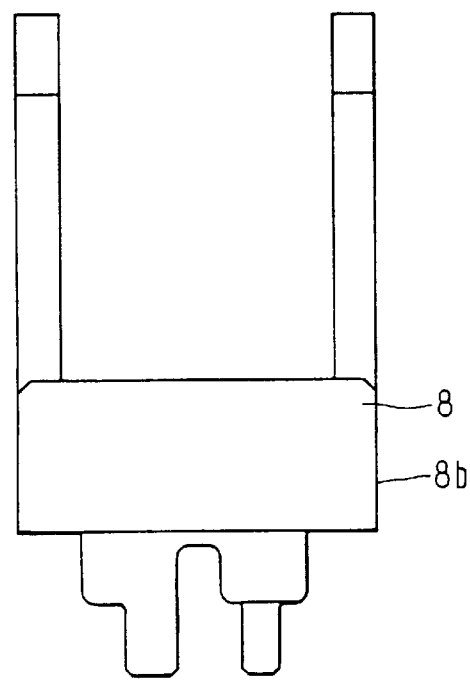
FIG. 16 is a front view indicating a structure of a housing according to the prior art.

For example, FIG. 16 indicates a front view of a prior art where the press-fit portion 8$b$ of the housing 8 is formed with a uniform outer peripheral configurational dimension without providing an escape portion on the housing 8. Because the outer peripheral configurational dimension of the press-fit portion 8$b$ of the housing 8 is substantially equal to an inner peripheral configurational dimension of the cover 9, provisional assembly of the housing 8 and cover 9 becomes unstable.

Figure 17:
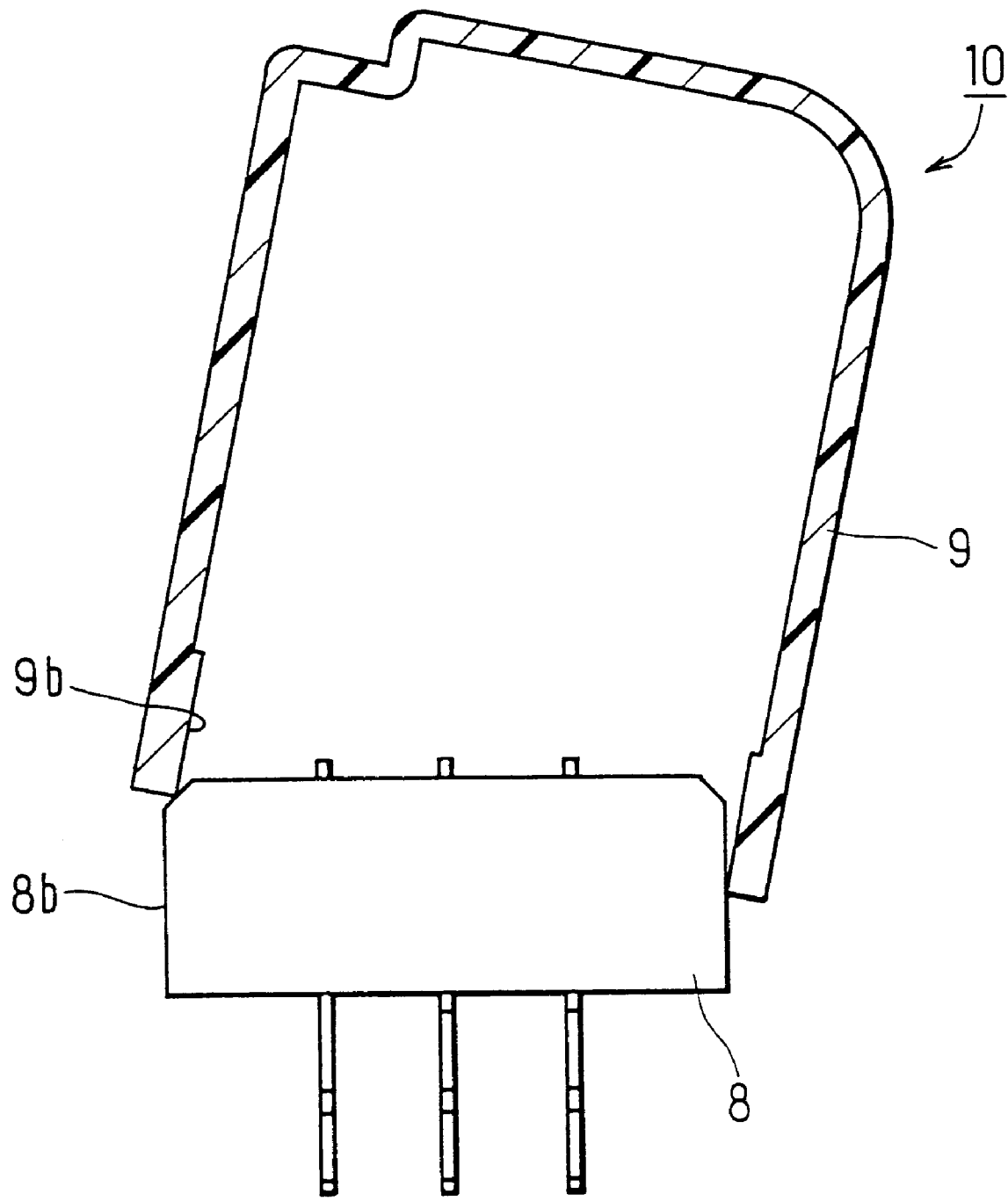
FIG. 17 is a right-hand view indicating a state wherein a cover is tilted when the cover is joined employing a housing according to the prior art.

FIG. 17 is a right-hand view indicating a state of unstable provisional assembly of a cover 9 and a housing 8 lacking an escape portion.

When no escape portion is provided on the housing 8, the outer peripheral configurational dimension of the press-fit portion 8b of the housing 8 and an inner peripheral configurational dimension of a press-fit portion 9b of the cover 9 are tight, and so the cover 9 tilts with respect to the housing 8, as shown in FIG. 17.

Because provisional assembly of the cover 9 and housing 8 must be carried out prior to press-fitting the cover 9 and housing 8 without causing the cover 9 to be tilted, work performance of assembly of the acceleration detecting device 10 declines.

Additionally, because provisional assembly of the housing 8 and cover 9 is unstable, there exists the possibility of the cover 9 tilting with respect to the housing 8 during press-fitting even if it was possible to perform provisional assembly favorably, and in this case the occurrence of damage to the cover 9 such as splitting or the like may be unavoidable.

According to the present embodiment, as shown in FIG. 12, by providing an escape portion 8a of a uniform outer peripheral configuration dimension which is smaller than an outer peripheral configuration dimension of a press-fit portion 8b of the housing 8, the escape portion 8a and the press-fit portion 9b of the cover 9 mate loosely, and so the housing 8 and cover 9 can easily be provisionally assembled.

Moreover, the escape portion 8a of the housing 8 can be caused to act as a guide during provisional assembly of the housing 8 and cover 9, and provisional assembly of the housing 8 and cover 9 can be performed with arrangement of the posture.

When the housing 8 is press-fitted to the cover 9 after provisional assembly of the housing 8 and cover 9, the housing 8 and cover 9 are provisionally assembled with the posture arranged, and so the housing 8 can be caused to be press-fitted to the cover 9 in a stabilized manner, the press-fit portion 8b and press-fit portion 9b mate favorably, and there is no occurrence of damage such as splitting to the cover 9.

In this way, according to the present embodiment assembly performance of the acceleration detecting device 10 is improved by providing an escape portion 8a on the housing 8, and along with this, there is no occurrence of damage such as splitting, and so quality of the acceleration detecting device 10 can be caused to improve.

In the foregoing structure indicated in FIG. 11 the escape portion 8a was disposed on the housing 8, but it is also acceptable to dispose an escape portion on a cover 9.

Figure 13:
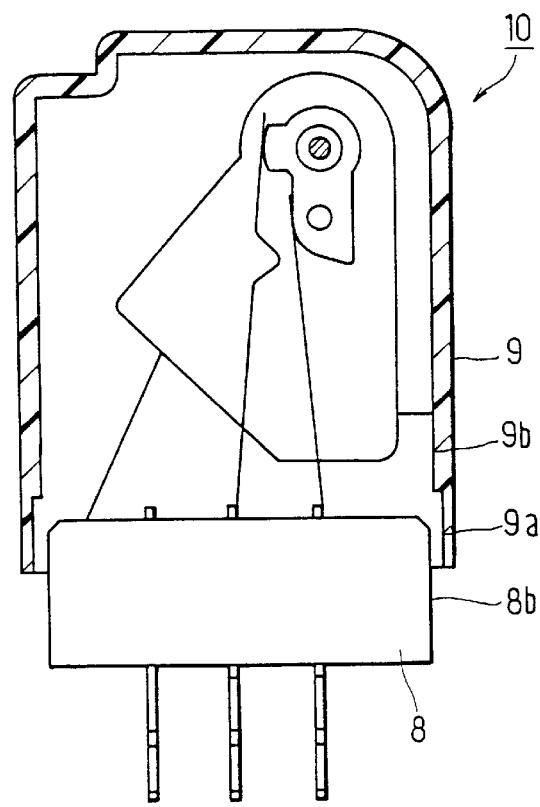
FIG. 13 is a right-hand view of an acceleration detecting device according to an eighth embodiment of the present invention, indicating a structure where an escape portion is formed on a cover.

FIG. 13 indicates, as an eighth embodiment, a right-hand view of an acceleration detecting device 10 in a case where an escape portion 9a of a uniform inner peripheral configurational dimension which is larger than an inner peripheral configurational dimension of a press-fit portion 9b of a cover 9 is disposed. A structure which does not dispose an escape portion on a housing 8 is utilized at this time.

As shown in FIG. 13, the inner peripheral configurational dimension of the escape portion 9a is larger than an outer peripheral configurational dimension of a press-fit portion 8b on a housing 8 due to the provision of the escape portion 9a on the cover 9, and so the escape portion 9a and press-fit portion 8b mate loosely, and provisional assembly of the housing 8 and cover 9 can easily be performed.

Additionally, because the escape portion 9a of the cover 9 acts as a guide during provisional assembly of the housing 8 and cover 9 and provisional assembly of the housing 8, and cover 9 can be performed with the posture arranged, the housing 8 and cover 9 can be caused to be press-fitted in a stabilized manner, and press-fitting of the press-fit portion 8b of the housing 8 and press-fit portion 9b of the cover 9 can be accomplished favorably.

Moreover, the escape portion 8a of the housing 8 shown in FIG. 11 and the escape portion 9a of the cover 9 shown in FIG. 13 were respectively of a uniform outer peripheral configurational dimension and inner peripheral configurational dimension, but it is also acceptable if the outer peripheral configurational dimension and inner peripheral configurational dimension of the escape portions are not uniform.

Figure 14:
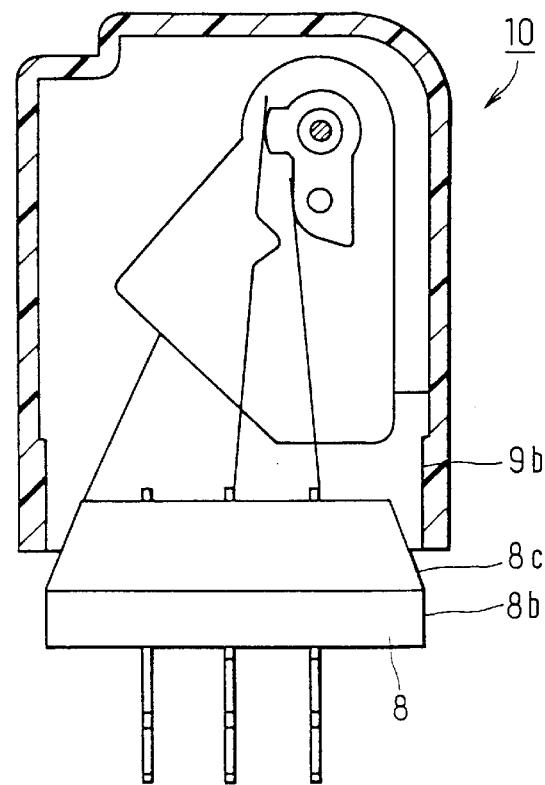
FIG. 14 is a right-hand view of an acceleration detecting device according to a ninth embodiment of the present invention, indicating a structure where a tapered portion is formed on a housing.
Figure 15:
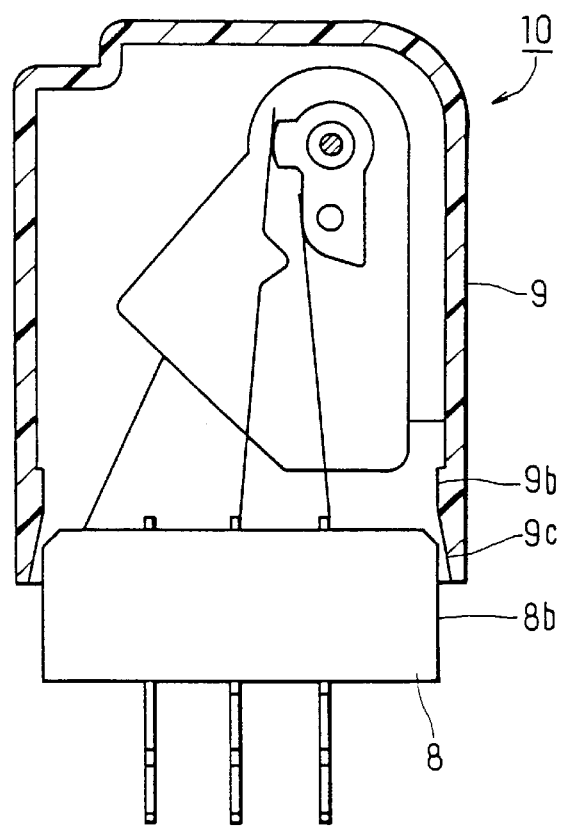
FIG. 15 is a right-hand view of an acceleration detecting device according to a tenth embodiment of the present invention, indicating a structure where a tapered portion is formed on a cover.

For example, FIG. 14 indicates, as a ninth embodiment, a right-hand view of an acceleration detecting device 10 in a case where a tapered portion 8c of an outer peripheral configurational dimension smaller than an outer peripheral configurational dimension of a press-fit portion 8b is provided on a housing 8, and FIG. 15 indicates, as a tenth embodiment, a right-hand view of an acceleration detecting device 10 in a case where a tapered portion 9c of an inner peripheral configurational dimension smaller than an inner peripheral configurational dimension of a press-fit portion 9b is provided on a cover 9.

At this time, no escape portion is disposed on the cover 9 in FIG. 14, and no escape portion is disposed on the housing 8 in FIG. 15.

As shown in FIG. 14, the outer peripheral configurational dimension of the tapered portion 8c is smaller than an inner peripheral configurational dimension of the press-fit portion 9b of the cover 9 due to the tapered portion 8c being provided on the housing 8, and so the tapered portion 8c and the press-fit portion 9b of the cover 9 mate loosely, and provisional assembly of the housing 8 and cover 9 can easily be performed.

Additionally, because the tapered portion 8c acts as a guide during provisional assembly of the housing 8 and cover 9, and provisional assembly of the housing 8 and cover 9 can be performed with the posture arranged, the housing 8 and cover 9 can be caused to be press-fitted in a stabilized manner, and press-fitting of the press-fit portion 8b of the housing 8 and press-fit portion 9b of the cover 9 can be accomplished favorably.

As shown in FIG. 15, a similar effect can also be obtained by disposing the tapered portion 9c on the cover 9.

That is to say, because the inner peripheral configurational dimension of the tapered portion 9c is larger than the outer peripheral configurational dimension of the press-fit portion 8b of the housing 8, the tapered portion 9c and press-fit portion 8b mate loosely, and provisional assembly of the housing 8 and cover 9 can easily be accomplished.

Additionally, because the tapered portion 8c acts as a guide during provisional assembly of the housing 8 and cover 9, and provisional assembly of the housing 8 and cover 9 can be performed with the posture arranged, the housing 8 and cover 9 can be caused to be press-fitted in a stabilized manner, and press-fitting of the press-fit portion 8b and press-fit portion 9b of the cover 9 can be performed favorably.

Furthermore, according to the present embodiment an escape portion was disposed on either the housing 8 or the cover 9, but a structure which forms an escape portion on both the housing 8 and cover 9 is also acceptable.

An eleventh embodiment according to the present invention will be described next.

Figure 18A:
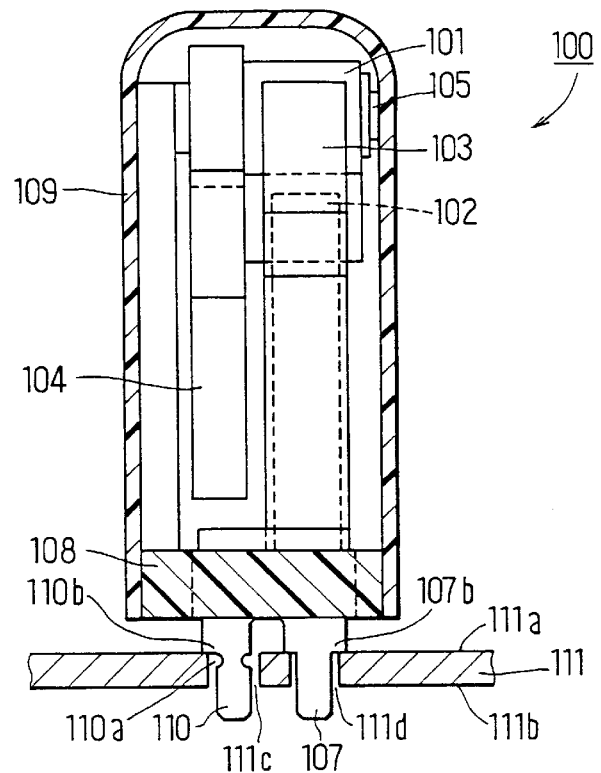
FIG. 18A is a front view of an eleventh embodiment according to the present invention showing a state when terminals for installation use and signal-output terminals have been inserted into through-holes of a substrate.
Figure 18B:
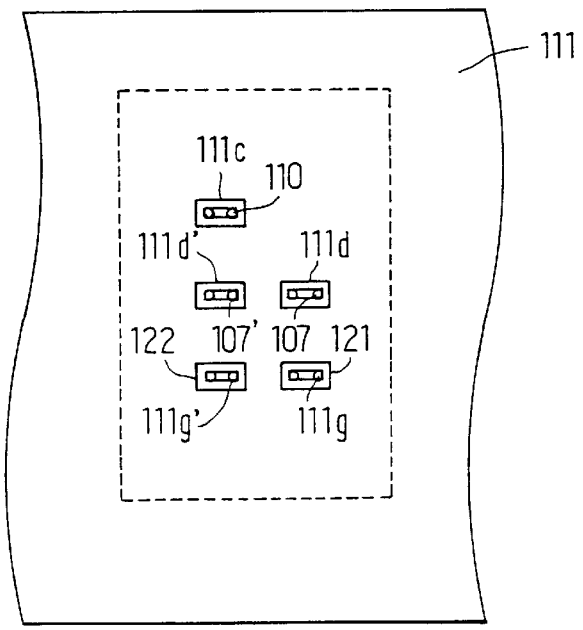
FIG. 18B is a bottom view of an eleventh embodiment according to the present invention showing a state when terminals for installation use and signal-output terminals have been inserted into through-holes of a substrate.

FIG. 18A and FIG. 18B are a front view and a bottom view indicating a state when terminals 110 and 122 for installation use and signal-output terminals 107, 107', and 121 disposed on a housing 108 of an acceleration detecting device 100 employed on a vehicle have respectively been inserted into insertion (through) holes 111c, 111g', 111d, 111d', 1111g of a substrate 111.

Figure 19:
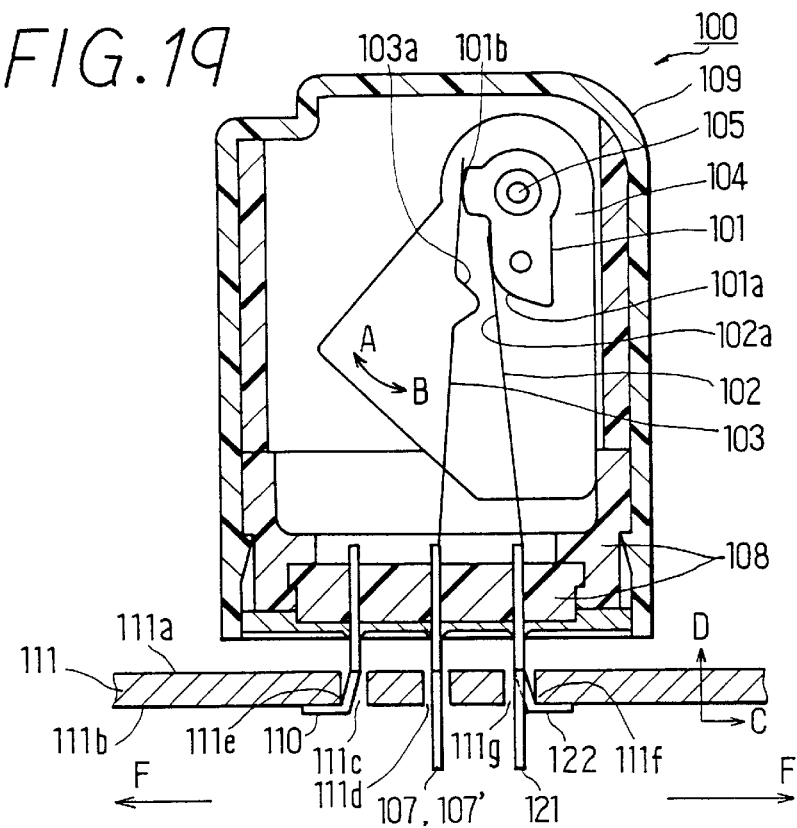
FIG. 19 is a side view of the eleventh embodiment according to the present invention showing a state when terminals for installation use and signal-output terminals have been inserted into through-holes of the substrate and the terminals for installation use have been bent.

Additionally FIG. 19 indicates a side view of when the terminals 110 and 122 for installation use have been bent and crimped after insertion of the terminals 110 and 122 for installation use and the signal-output terminals 107, 107' and 121 into the insertion holes 111c, 111d, 111d', 111g, 111g'.

The acceleration detecting device 100 is structured primarily from a weight 104 having an eccentric center of gravity and rotational center, a rotor 101 which rotates together with the weight 104, a pair of plate springs 102 and 103, and shaft 105 becoming a center for rotation of the weight 104 and plate spring rotor 101.

In addition to this, the acceleration detecting device 100 is structured from a signal-output terminals 107, 107' and 121 to output a contacting state of the plate springs 102 and 103 to an external portion as electrical signals, terminals 110 and 122 for installation use of gold fabrication to fix the acceleration detecting device 100 to a substrate 111, a cover 109, and a housing 108.

Moreover, of the above-described structure, the signal-output terminals 107 and 107' and signal-output terminal 121 and the terminal for installation use 122 are formed of respectively separate bodies which are integrally crimped, and the terminal 110 for installation use is formed of a discrete body.

Figure 20A:
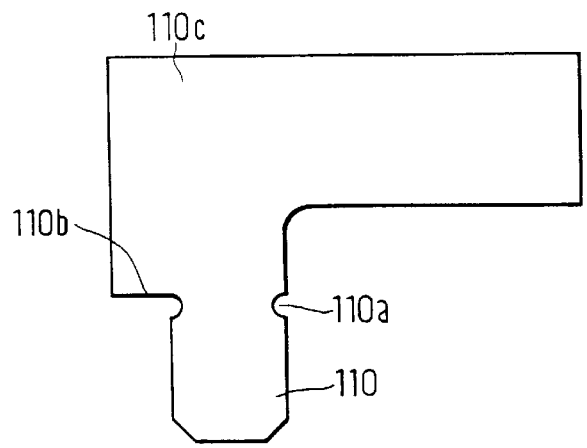
FIG. 20A is a structural diagram indicating a structure of the terminal for installation use of the eleventh embodiment according to the present invention.
Figure 20B:
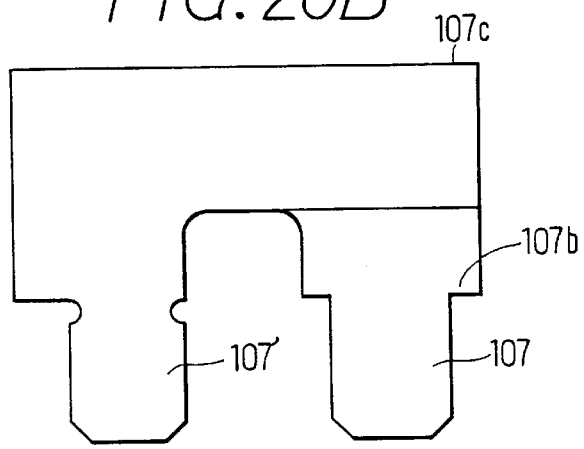
FIG. 20B is a structural diagram indicating a structure of the signal-output terminal.
Figure 20C:
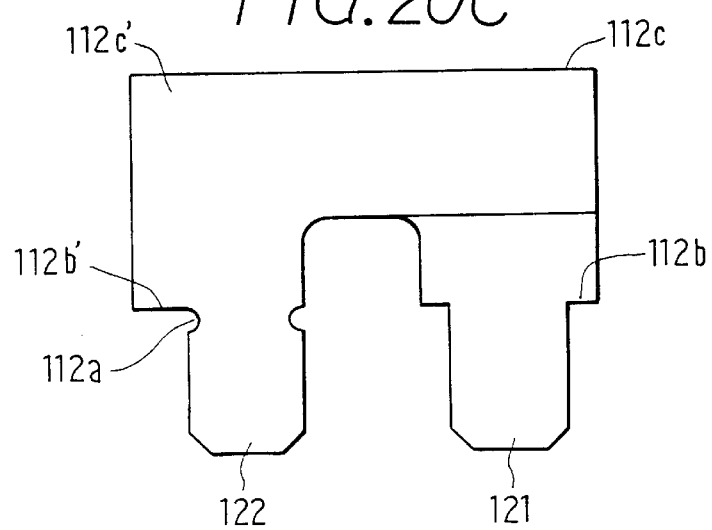
FIG. 20C is a structural diagram indicating a structure of a terminal doubling in use as a terminal for installation use and a signal-output terminal.

The structures of the signal-output terminals 107 and 107', the terminal 110 for installation use, and the signal-output terminal 121 and terminal 122 for installation use are shown respectively in FIGS. 20A, 20B, and 20C.

According to the present embodiment, the configuration of the terminals 110 and 122 for installation use are formed by stamping.

Relationships between the several structures and a mode of operation of the acceleration detecting device 100 will be described next with reference to FIG. 19.

The weight 104 is installed freely rotatably with respect to the shaft 101, and an axial center of rotation due to the shaft 105 is positioned above a center of gravity of the weight 104.

When for example a vehicle collides, deceleration (negative acceleration) occurs and inertial force is applied in direction A in the drawing with respect to the weight center of the weight 104.

Due to this inertial force acting on the center of gravity, the weight 104 rotates in direction A with the shaft 105 as the center. A structure is utilized whereby the cover 109 is employed as a stopper of the weight 104, the cover 109 and weight 104 contact, and the weight 104 is not allowed to rotate in direction A for a predetermined angle of rotation or more at this time.

Additionally, during acceleration of the vehicle, acceleration of a direction opposite to a direction of deceleration is applied to the center of gravity of the weight 104, and the weight 104 rotates in direction B in the drawing. At this time as well, a structure is utilized whereby the cover 109 is employed as a stopper of the weight 104, the cover 109 and weight 104 contact, and the weight 104 is not allowed to rotate in direction B for a predetermined amount of rotation or more.

The rotor 101 has a first cam 101a and a second cam 101b, is fixed on the weight 104, and shares the shaft 105 with the weight 104.

During collision of the vehicle, the weight 104 rotates in direction A in the drawing, and in accompaniment to this, the rotor 101 also rotates in direction A. Additionally, during acceleration of the vehicle, the weight 104 rotates in direction B in the drawing, and in accompaniment to this, the rotor 101 also rotates in direction B.

The plate springs 102 and 103 respectively have contact points 102a and 103a, and respectively contact the first cam 101a and second cam 101b of the rotor 101 and urge the rotor 101 in direction B in the drawing.

During collision of the vehicle, when the rotor 101 rotates in accompaniment with the rotation of the weight 104, the first cam 101a and second cam 101b are displaced.

The plate springs 102 and 103 respectively contacting the first cam 101a and second cam 101b of the rotor 101 are presses in direction A in the drawing, the gap of the contact point 102a and contact point 103a narrows, and ultimately the contact point 102a and contact point 103a make contact.

This contacting state of the contact point 102a and contact point 103a is detected as electrical signals from the signal-output terminals 107, 107', and 122 respectively fixed at the plate springs 102 and 103 and the housing 108. The electrical signals are used as acceleration detecting signals.

Moreover, according to the above-described structure, the plate springs 102 and 103 constantly urge the rotor 101 in a direction opposite to a direction of deceleration during collision, and so they also have a function of preventing actuation of the acceleration detecting device 100 due to vibration or the like during travel of the vehicle.

The structure of the terminals 110 and 122 for installation use which are employed to fix the acceleration detecting device 100 composed of the above-described structure to the substrate 111 and the signal-output terminals 107, 107', and 121 will be described next with reference to FIG. 20.

The terminals 110 and 112 for installation use are composed of notch portions 110a and 122a notched in a semi-circular configuration, contact portions 110b and 112b' which contact an upper surface 111a of the substrate 110, and fixed portions 110c and 112c' which are fixed to the housing 108.

These fixed portions 110c and 112c' are fixed by insert formation with respect to the housing 108.

Furthermore, terminals 110 and 122 for installation use which cause the length between the notch portions 110a and 112a and the contact portions 110b and 112b' to be zero are formed according to the present embodiment.

Additionally, the signal-output terminals 107, 107' and 121 are composed of contact portions 107b and 121b which contact an upper surface 111a of the substrate 110, and contact portions 107c and 112c which are fixed to the housing 108 and contact the plate springs 102 and 103.

The method of fixing to the substrate 111 of an acceleration detecting device 100 employing the terminals 110 and 122 for installation use and signal-output terminals 107, 107', and 121 will be described next with reference to FIGS. 18 and 19.

Firstly, the terminals 110 and 122 for installation use and signal-output terminals 107, 107', and 121 are inserted from the upper surface 111a side of the substrate 111 into the insertion holes 111c, 111g' 111d, 111d', and 111g respectively provided in the substrate 111 until the respective contact portions 110b, 112b', 107b, and 112b of the terminals 110 and 122 for installation use and signal-output terminals 107, 107', and 121 contact to the upper surface Lila of the substrate 111. At this time, the terminals 110 and 122 for installation use and signal-output terminals 107, 107', and 121 pass through the substrate 111.

Herein, the notch portions 110a and 112a of the terminals 110 and 122 for installation use are positioned at upper ends of the insertion holes 111c and 111g'.

After the terminals 110 and 122 for installation use and signal-output terminals 107, 107', and 121 have passed through the substrate 111, an external force F is applied in a direction parallel to the lower surface 111b and crimping is performed with respect to a portion of the terminals 110 and 122 for installation use protruding from a lower surface 111b side.

Due to the action of this external force F, the terminals 110 and 122 for installation use bend from the notch portions 110a and 112a, and the portion protruding from the lower surface 111b side is bent along the lower surface 111b with insertion hole lower ends 111e and 111f as fulcrums.

In this way, the terminals 110 and 112 for installation use can apply load in two directions: a radial direction (direction C in the drawing) of the insertion holes 111c and 111g along the lower surface of the substrate 111 and a direction of plate thickness (direction D in the drawing) of the substrate 111.

Figure 22:
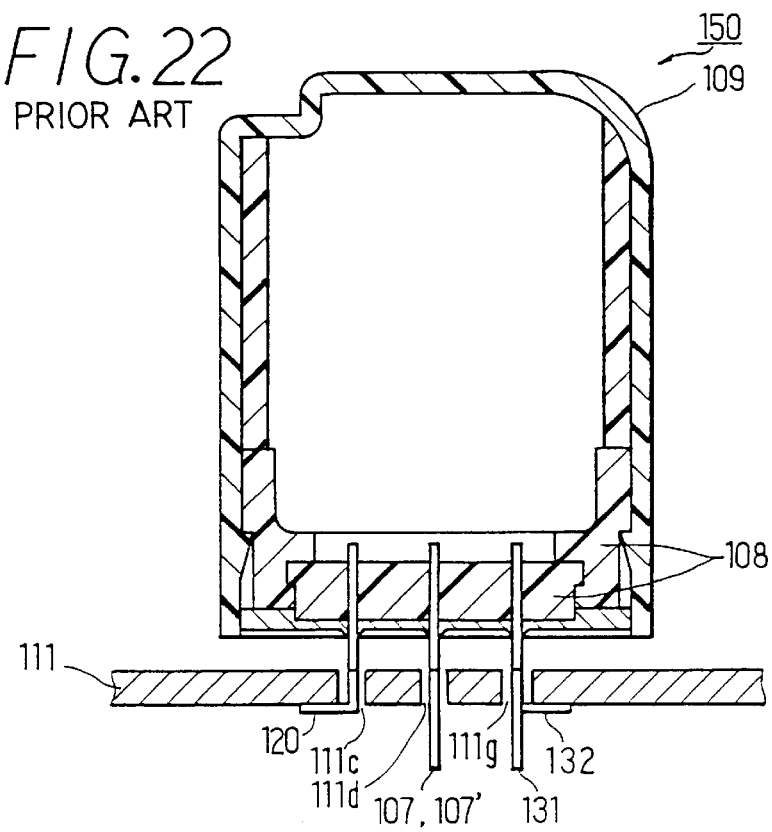
FIG. 22 is a side view of an acceleration detecting device according to the prior art showing a state when a terminal for installation use and signal-output terminal have been inserted into an insertion hole of a substrate and the terminal for installation use has been bent.
Figure 21A:
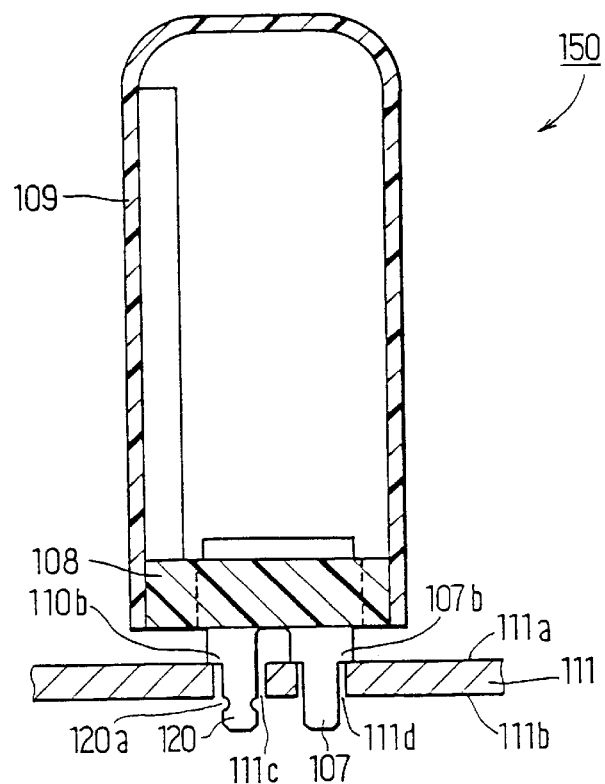
FIG. 21A is a front view of an acceleration detecting device according to the prior art showing a state when a terminal for installation use and signal-output terminal have been inserted into through-holes of a substrate.
Figure 21B:
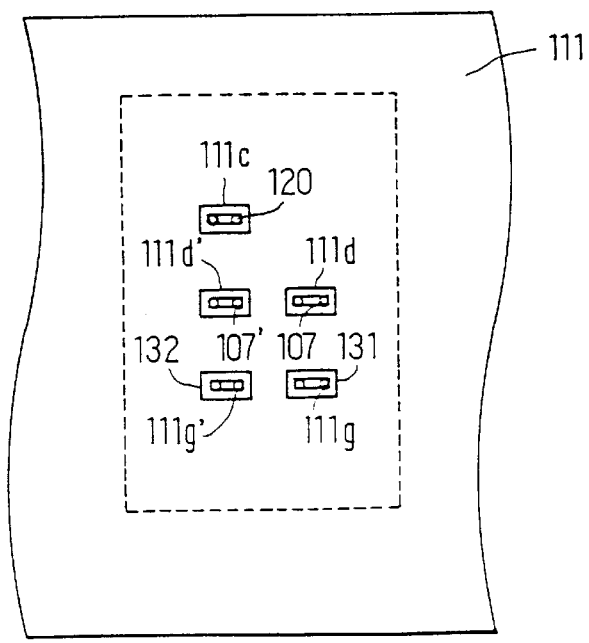
FIG. 21B is a bottom view of an acceleration detecting device according to the prior art showing a state when a terminal for installation use and signal-output terminal have been inserted into through-holes of a substrate.

Due to this load, the contact portions 110b and 112b, of the terminals 110 and 122 for installation use and respectively crimped portions can squeeze the substrate 111, and so the collision detecting device 100 can be fixed on the substrate 111 more firmly in comparison with a prior-art device 150 indicated in FIGS. 21 and 22. Furthermore, according to this prior-art device 150 a notch portion 120a is formed on a portion of terminals 120 and 132 for installation use protruding from the substrate 111.

After the acceleration detecting device 100 is fixed to the substrate 111 by the terminals 110 and 122 for installation use, the signal-output terminals 107, 107', and 121 and the terminals 110 and 122 for installation use are soldered to the substrate 111.

Electrical connection of the acceleration detecting device 100 and the substrate 111 is accomplished by this soldering, and installation of the acceleration detecting device 100 to the substrate 111 is completed.

Moreover, the signal-output terminals 107, 107', and 121 are fixed to the substrate 111 only by this soldering.

According to the foregoing embodiment, the terminals 110 and 122 for installation use are fixed to the housing 108 by insert formation, but fixing the terminals 110 and 122 for installation use to the housing 108 by adhesive, screws, or the like is also acceptable.

Additionally, the acceleration detecting device 100 utilized a structure of detecting a contacting state between the contact points 102a and 103a of the pair of plate springs 102 and 103, but a structure wherein an acceleration detecting device having one pair or more of plate springs can detect a plurality of contacting states between contact points is also acceptable.

Furthermore, the present embodiment utilized a structure wherein the signal-output terminals 107 and 107' as well as the signal-output terminal 121 and terminal 122 for installation use were respectively formed as separate bodies and crimped to become an integral body, and the terminal 110 for installation use was formed as a discrete structure, but structuring of terminals for installation use and signal-output terminals entirely of separate bodies is also acceptable, and utilization of a structure wherein terminals for installation use and signal-output terminals are all caused to double in use is acceptable as well.

In addition, according to the present embodiment the terminals 110 and 122 for installation use were structured of brass, but it is acceptable to structure the terminals for installation use of any material which does not cause splitting, voiding, or the like to occur when performing crimping is acceptable.

The present embodiment utilized a structure wherein the notch portions 110a and 112a were disposed on an upper end of the insertion holes 11c and 111g' by causing the length between the notch portions 110a and 112a and the contact portions 110b and 112b' of the terminals 110 and 122 for installation use to be zero, but the present invention is not exclusively restricted to this, and a structure disposing the notch portions 110a and 112a within the insertion holes 11c and 111g' is also acceptable.

That is to say, the length from the contact portions 110b and 112b' to the notch portions 110a and 112a of the terminals 110 and 122 for installation use must be less than the plate thickness of the substrate 111.

According to the present embodiment, the configuration of the notch portions 110a and 112a of the terminals 110 and 122 for installation use was a semicircular configuration, but the present invention is not exclusively restricted to this, and an elliptical configuration, a triangular configuration, a rectangular configuration, a configuration combining lines and curves, and so on—i.e., any configuration forming a constriction so that the sectional surface area of the terminals 110 and 122 for installation use becomes smaller than another portion—is acceptable. Preferably, to avoid splitting or the like of a minimum sectional surface area due to stress concentration, any portion of an minimum sectional surface area of the notched portions 110a and 112a having curvature is acceptable.

According to the present embodiment, a structure installing the acceleration detecting device 100 on the substrate 111 was described, but the present invention is not exclusively restricted to this, and is effective even when the acceleration detecting device 100 is installation on a material other than the substrate 111, a housing, or the like. Further, the present invention can be applied to an electronic-component device other than the acceleration detecting apparatus.

According to the present invention, as indicated above, a notch portion of terminals 110 and 122 for installation use can be disposed within an insertion hole of a substrate 111, particularly at an upper end of the insertion hole when a contact portion of the terminals 110 and 122 for installation use contact one side of the substrate 111, by causing a length from the contact portion to the notch portion to be smaller than plate thickness of the substrate, or by forming the notch portion to be continuous with the contact portion.

Due to this, when force is applied in a direction parallel to the substrate with respect to the terminals 110 and 122 for installation use protruding on a side of another surface of the substrate, a side-surface portion of the terminals 110 and 122 for installation use contacts a side surface of the installation hole, and the terminals 110 and 122 for installation use can apply a load in a direction of plate thickness of the substrate 111 and in a radial direction of the insertion hole. Thereby The substrate can be squeezed by a portion where the terminals 110 and 122 for installation use is bent and the contact portion thereof, and the acceleration detecting device can be fixed to the substrate.

As a result of this, assembly-dimension precision of the acceleration detecting device 100 improves and work performance of assembly can also improve with no occurrence of play between the acceleration detecting device 100 and substrate 111, even when plate thickness of the terminals 110 and 122 for installation use is thin.

Figure 23:
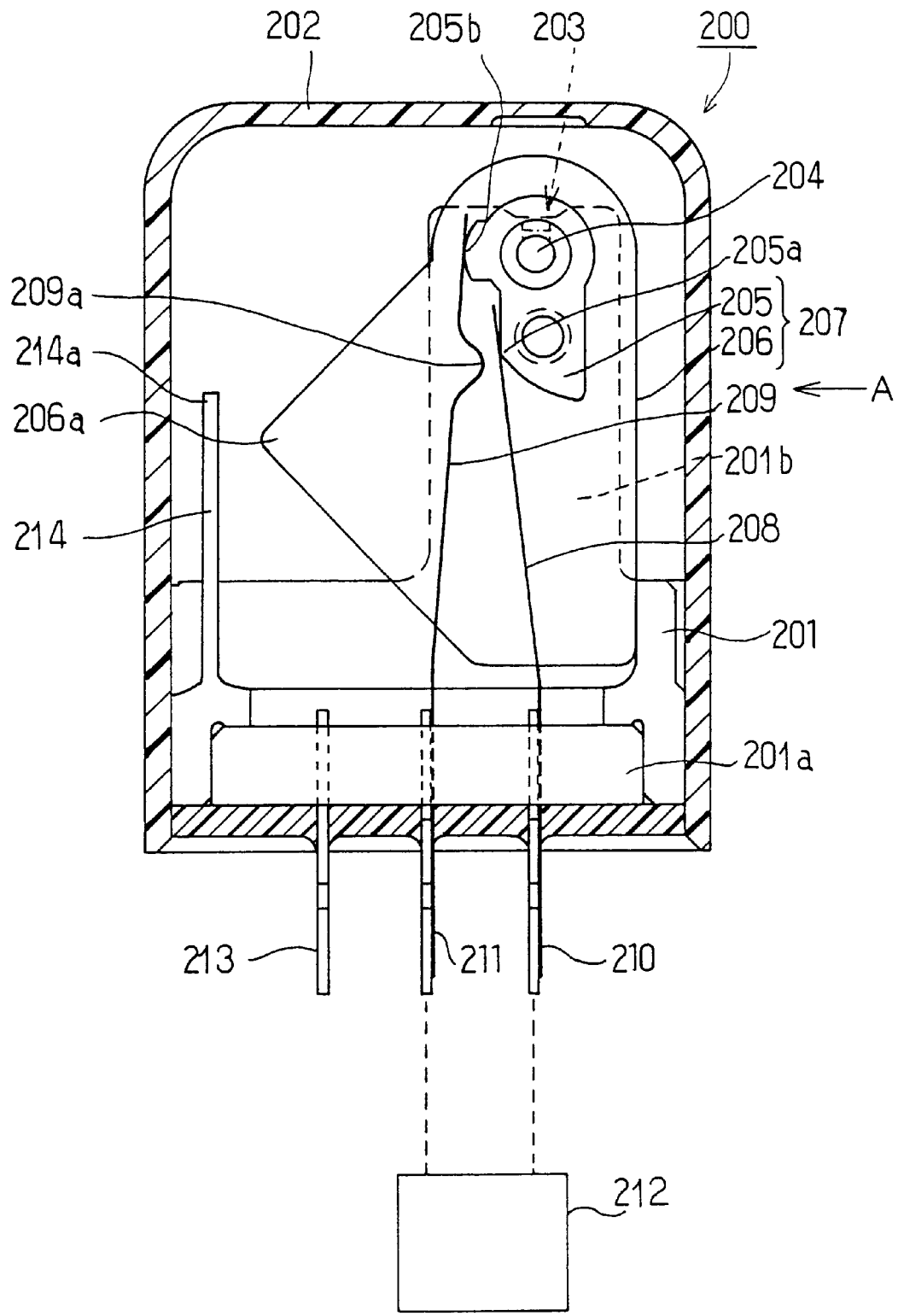
FIG. 23 is a front structural diagram indicating a structure of an acceleration detecting device according to a twelfth embodiment.

A twelfth embodiment of an acceleration detecting device according to the present invention will be described next with reference to the drawings. FIG. 23 is a front structural view of an acceleration detecting device 200.

A housing 201 is structured of a base 201a and a side plate 201b formed on a side edge of the base 201a perpendicularly to an upper surface of the base 201a. The base 201a and side plate 201b are formed of PBT (polybutylene terephthate). According to the present embodiment, the base 201a has a width of 14 mm, a depth of 10 mm, and a thickness of 2.5 mm, and the side plate has a width of 14 mm, a height of 22 mm, and a thickness of 2.5 mm. The entirety of the housing 201 is covered by a cover 202 of PBT fabrication.

The side plate 201b is formed with a groove-shaped bearing 203, and a shaft 204 is inserted into the bearing 203 by press-fitting and supported therein. A rotor 207 is structured of a weight 206 and a cam 205 has been insert-formed on a weight 206. (In this embodiment, a combination of the weight 206 and the cam 205 is defined as the rotor 207.) The rotor 207 is inserted through the shaft 204. According to the present embodiment, the shaft 204 has a diameter of 1 mm and is formed of SUS304 stainless steel.

The rotor 207 is structured so as to rotate in a clockwise direction of FIG. 23 with the shaft 204 as a rotational center when subjected to acceleration from the direction of arrow A in FIG. 23. According to the present embodiment, the rotor 207 is formed of copper and the cam 205 is formed by molding PBT on the surface of the copper.

A plate spring 208 as a first connection terminal and a plate spring 209 as a second connection terminal are respectively mounted on the base 201a of the housing 201 in a form where lower ends thereof are insert-formed within the base 201a. A uniform gap is placed between the two plate springs 208 and 209, one plate spring 208 contacts a first cam portion 205a of the cam 205, and the other plate spring 209 contacts a second cam portion 205b. A contact point 209a of convex configuration is flexibly formed on the plate spring 209.

The two plate springs 208 and 209 respectively contact the cams 205a and 205b so as to urge the rotor 207 in a direction opposite (a counterclockwise direction in FIG. 23) to a direction of rotation during a vehicle collision, and are such that the rotor 207 does not rotate even if the vehicle decelerates during travel and slight acceleration is received.

Terminals 210 and 211 of copper fabrication and respectively conducted with the plate springs 208 and 209 are also inserted into the portion of the base 201a where the plate springs 208 and 209 are inserted. These terminals 210 and 211 are conducted to outside the base 201a, and are connected to a drive circuit 212 to drive a passenger protection apparatus. Furthermore, a fixture 213 to install the present device to a substrate or the like is insert-formed on the base 201a.

Structure of a shock-reducing member 214 which is a characterizing portion of the present invention will be described next.

A shock-reducing member 214 of plate configuration is provided perpendicularly to an upper surface of the base 201a on an end portion (the left-hand edge in FIG. 23) of the base 201a of the rotational direction (the clockwise direction in FIG. 23) side of the weight 206. The shock-reducing member 214 is formed integrally with the base 201a in a form causing a plate surface thereof to oppose a tip portion 206a of the weight 206, and flexes due to plasticity thereof when subjected to external force in the surface direction.

Moreover, according to the present embodiment, the shock-reducing member 214 has a height of 7 mm and a thickness of 0.5 mm, and a gap between the tip portion 206a of the weight 206 and the shock-reducing member 214 is 1 mm in a state where the weight 206 is not rotating.

Operation of an acceleration detecting device according to the above-described structure until a rotation moment of the weight 206 is reduced, i.e., until shock force is alleviated, will be described next.

Figure 24:
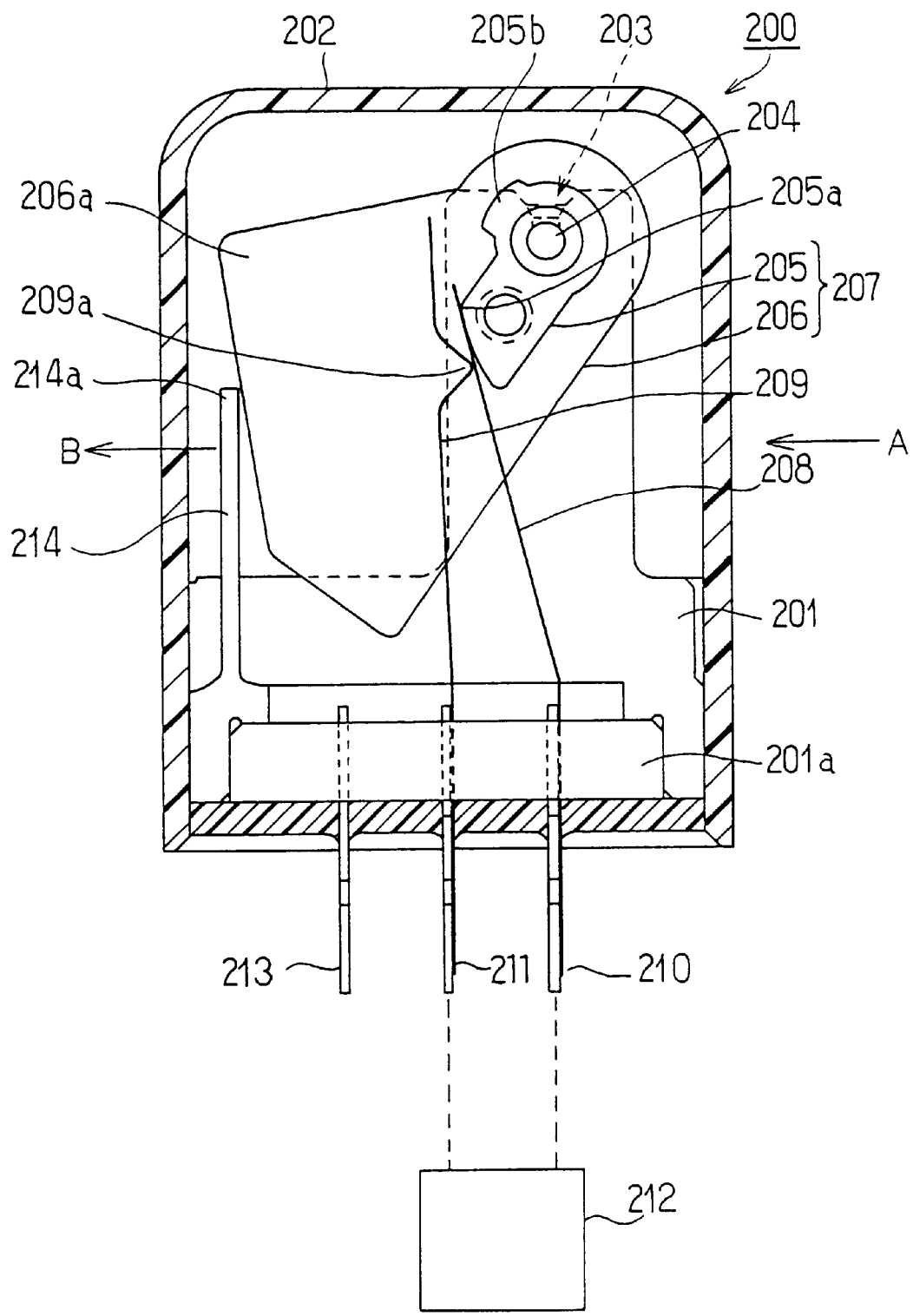
FIG. 24 front view indicating a state where a rotated rotor has contacted a shock-reducing member.

When the acceleration detecting device 200 is subjected to acceleration (shock) from the direction indicated by arrow A in FIG. 23, then as shown in FIG. 24, the rotor 207 rotates in the clockwise direction in the drawing due to the law of inertia. The first cam portion 205a of the cam 205 lowers the plate spring 208 in the direction of the plate spring 209 due to this rotation, and the tip of the plate spring 208 contacts the contact point 209a of the plate spring 209. Electrical conductance between the plate springs 208 and 209 is ensured by this contact, and detection of acceleration by the drive circuit 212 via the terminals 210 and 211 becomes possible. Additionally, the angle of rotation (first predetermined angle) of the rotor 207 when the tip of the plate spring 208 has contacted the contact point 209a of the plate spring 209 is 60° according to the present embodiment.

At this time, the tip portion 206a of the weight 206 which rotates together with the cam 205 contacts a tip portion 214a of the shock-reducing member 214, and as rotation of the weight 206 progresses, the weight 206 causes the shock-reducing member 214 to flex in the direction indicated by arrow B. Kinetic energy of the weight 206 is converted to elastic energy of the shock-reducing member 214 and is gradually reduced due to this flexion.

Furthermore, at a portion where the tip portion 206a of the weight 206 and the tip portion 214a of the shock-reducing member 214 make contact, friction force of the tip portion 206a and tip portion 214a is exerted in a tangential direction of a locus of a circle inscribed by the tip portion 206a, and reduction of the foregoing kinetic energy of the weight 206 is promoted.

The angle of rotation (second predetermined angle) of the rotor 207 when the tip portion 206a of the weight 206 has contacted the tip portion 214a of the shock-reducing member 214 is 40° and a maximum angle of rotation of the rotor 207 is 45° Additionally, the amount of flexion of the shock-reducing member 214 is 0.3 to 0.5 mm.

The moment of inertia of the weight 206 is gradually reduced in this way, and so occurrence of shock having a short collision time as when the weight 206 collides with the cover 202 according to the prior art can be prevented.

Consequently, separation of the contact-point portions of the plate springs and detection of acceleration becoming unstable due to shock of collision of the weight 206 can be prevented. Moreover, occurrence of shock noise when the tip portion 206a of the weight 206 collides with the cover 202 can also be eliminated.

It is also acceptable for the shock-reducing member 214 to be formed as a separate body and mechanically installed on the base 201a, and it is acceptable for the plate thickness of the tip portion 214a to be a thin wedge configuration. Additionally, it is acceptable for the shock-reducing member 214 to be positioned higher than the tip portion 206a of the weight 206 of the side surface of the cover 202 and formed so that the side surface opposed the upper surface of the base 201a.

A thirteenth embodiment according to the present invention will be described next with reference to FIGS. 25 and 26.

An acceleration detecting device according to the present embodiment is characterized by disposing a shock-reducing member on an upper area of a housing 201.

Figure 25:
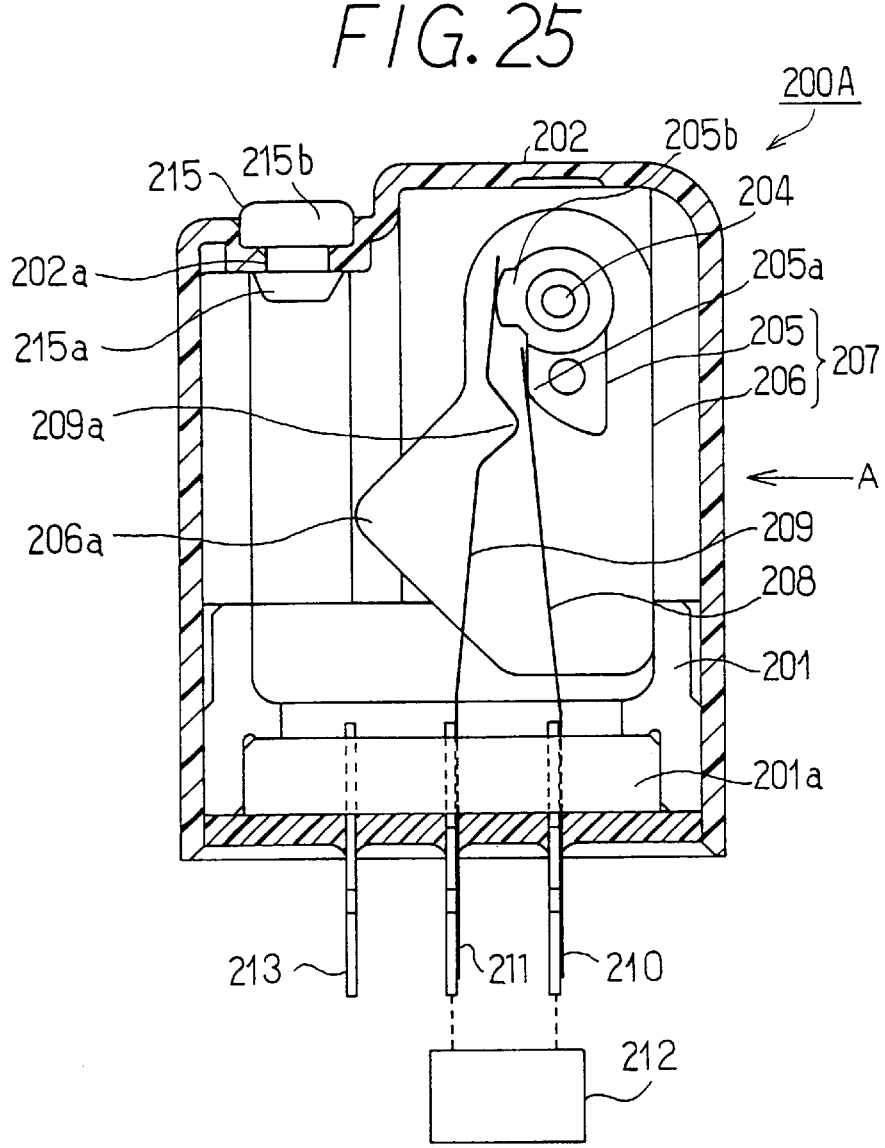
FIG. 25 is a front structural diagram wherein a shock-reducing member is installed on an upper area of a housing.
Figure 26:
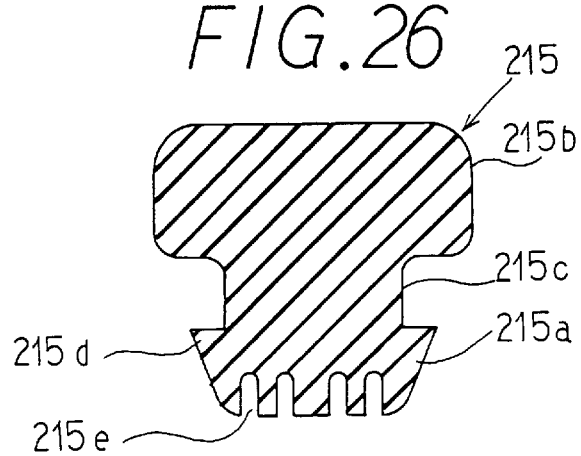
FIG. 26 is a sectional enlarged view of a shock-reducing member of a thirteenth embodiment.

As shown in FIG. 25, a hole 202a is formed on an upper surface of a cover 202 at that position where a locus inscribed by a tip portion of a weight 206 intersects with the upper surface of the cover 202, and a shock-reducing member 215 is fitted into this hole 202a. The shock-reducing member 215 is formed of elastic rubber, and is formed in a bottle-plug configuration as shown in FIG. 26. A constricted portion 215c of a configuration corresponding to the configuration of the hole 202a is formed between a collision member 215a and a base member 215b, and prevention of dislodgement is promoted by a collar portion 215d. A bottom surface of the shock-reducing member 215 may be formed in a plane as shown in FIG. 25, and a plurality of grooves 215e may be formed as shown in FIG. 26 to heighten the degree id alleviation of shock of the weight 206.

According to the present embodiment, the diameter of the base portion 215b of the shock-reducing member 215 is 3 mm, the diameter of the constricted portion 215c is 2 mm, and groove 215e width is 0.1 mm and depth is 0.2 mm.

Additionally, the shock-reducing member 215 may be formed of an elastic material other than elastic rubber.

Because an acceleration detecting device according to the present embodiment has the above-described structure, shock force (rotation moment) due to collision of the weight 206 can be reduced by causing the tip portion 206a of the weight 206 to collide with the bottom surface of the collision member 215a of the shock-reducing member 215.

Consequently, transmitting the shock due to collision of the weight 206 to the plate springs and separation of the contact-point portions can be prevented.

According to the present embodiment, shock-reducing member 215 was fitted in and fixed to the hole 202a formed on the upper surface of the cover 202, but fixing to an upper wall of the cover 202 by adhesive or the like is also acceptable.

A fourteenth embodiment according to the present invention will be described next with reference to FIG. 27.

An acceleration detecting device according to the present embodiment is characterized forming a plurality of slits on one plate spring.

FIGS. 27A and 27B are an explanatory drawing of plate springs formed on a base 201a by insert formation; FIG. 27A is a front view thereof, and FIG. 27B is a left-hand view of a plate spring 208.

As shown in FIG. 27B, sevens slits 208b of differing length running from an upper end to the base 201a are formed on a contact-point portion 208a of the plate spring 208 by stamping or wire-cutting, assuming a form of division into a plurality of plate springs of differing length. The slits 208b become longer moving from the right-hand edge to the left-hand edge of the drawing, and according to the present embodiment, length L1 of the shortest slit is 3 mm (L2=4 mm and L5=5 mm), length L7 of the longest slit is 9 mm, and the width of each slit 8b is 0.1 mm. The plate spring 208 width is 2.4 mm and height is 10 mm.

As an incidental comment, the characteristic vibration frequency of a plate spring differs according to the spring length thereof, and so a plurality of plate springs of differing characteristic vibration frequency have come to be formed on the plate spring 208.

Accordingly, in a case where the plate spring 208 has vibrated due to shock generated by collision of the weight 206 on the cover 202, the divided several plate springs have respectively differing characteristic vibration frequencies, and there exist plate springs which resonate and plate springs which do not resonate according to the vibration thereof. That is to say, resonating plates separate from the contact-point portion, but plate springs which do not resonate do not separate from the contact-point portion, and so conductance of the contact-point portion is maintained.

Consequently, a stabilized acceleration-detection signal can be output.

It is also acceptable to form a plurality of slits on the plate spring 209, and the plate springs 208 and 209 may be mechanically fixed to the base 201a by riveting or the like. Additionally, it is also possible to vary the characteristic vibration frequency of the several plate springs by causing the respective thicknesses of the several separated plate springs to differ.

In addition, materials forming the housing 201, shaft 204, rotor 207, plate springs 208 and 209, terminals 210 and 211, and so on are not exclusively limited to those of the above-described embodiment.

According to the present embodiment, as described above, separation of the contact-point portions can be prevented by causing shock force generated by collision of the rotor 207 to be reduced, and so a stabilized acceleration-detection signal can be output with no interruption.

An acceleration detecting device of a fifteenth embodiment according to the present invention will be described next.

Figure 28:
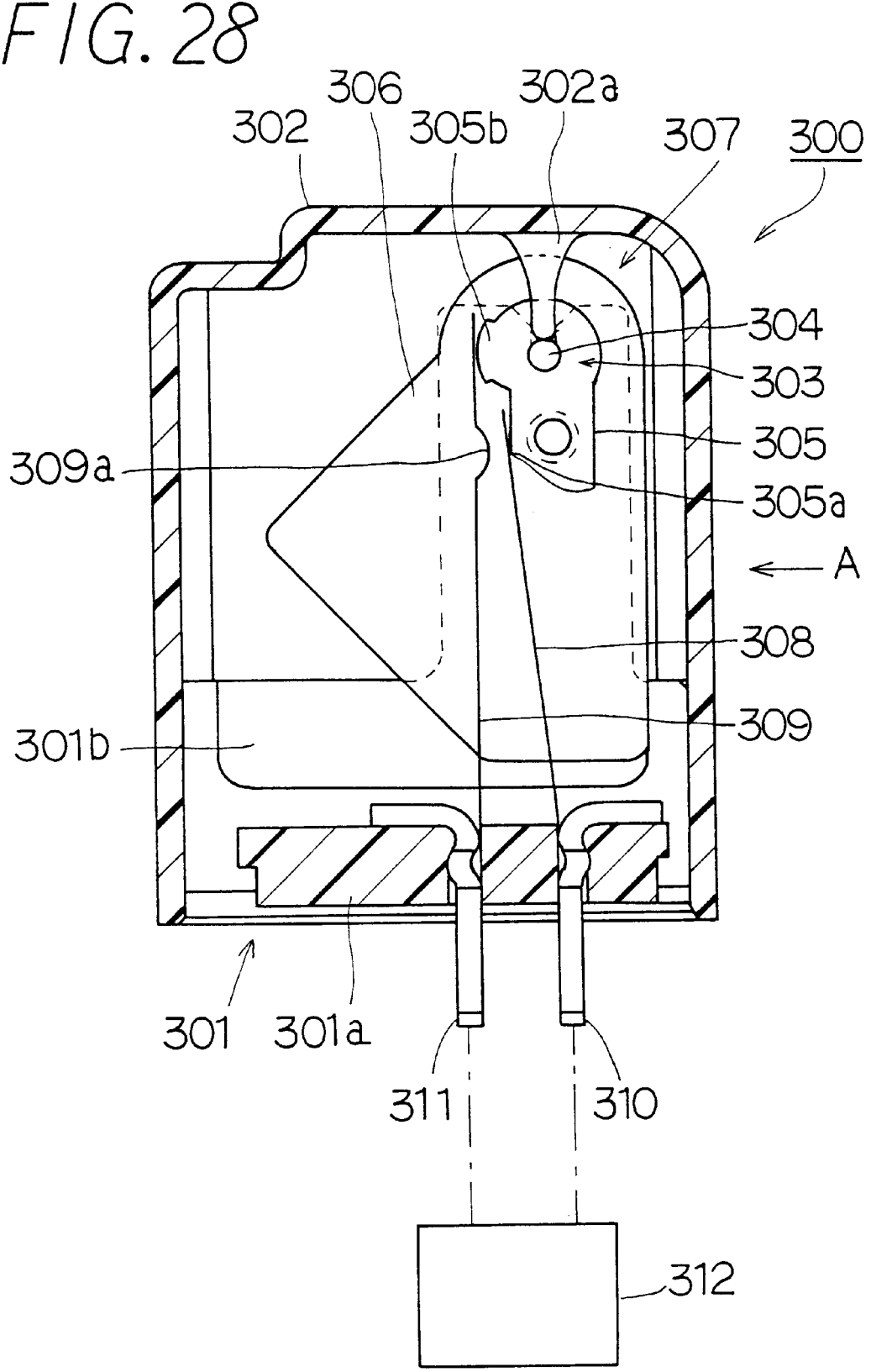
FIG. 28 is a front view indicating a structure of an acceleration detecting device according to a fifteenth embodiment.
Figure 29:
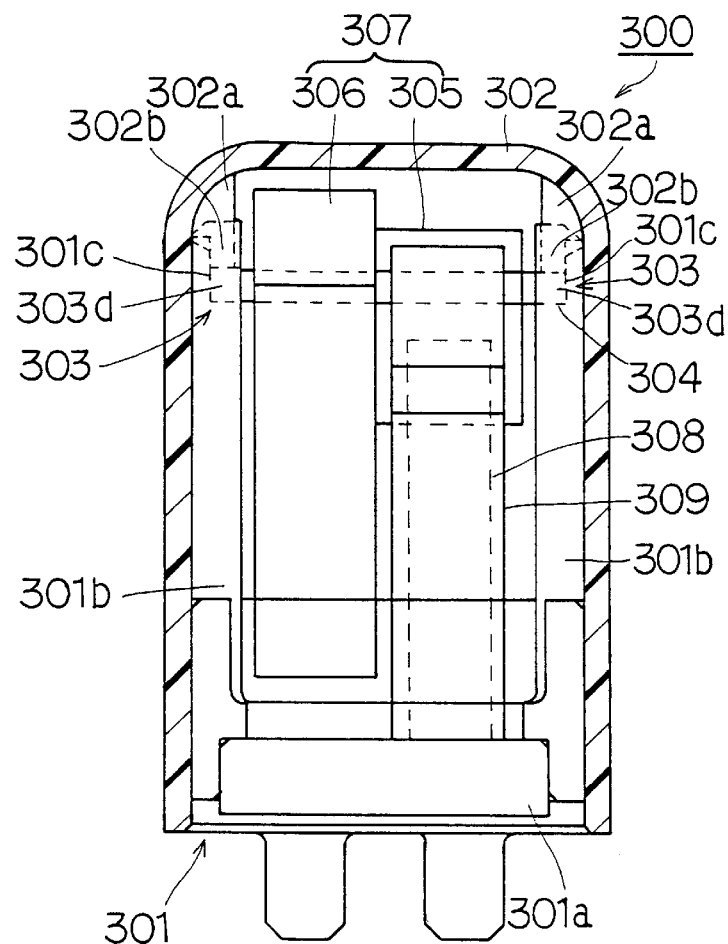
FIG. 29 is a left-hand structural diagram indicating a structure of an acceleration detecting device according to the fifteenth embodiment.

FIG. 28 is a front structural diagram of an acceleration detecting device 300 according to a fifteenth embodiment, and FIG. 29 is a left-hand structural diagram thereof.

Firstly, structure of a housing 301 will be described.

The housing 301 is structured of a base 301a and two side plates 301b respectively formed perpendicularly to an upper surface of the base 301a at mutually opposing side edges of the base 301a. The base 301a and two side plates 301b are formed of PBT (polybutylene terephthate). The base 301a has a width of 14 mm, a depth of 10 mm, and a thickness of 2.5 mm, and the side plates 301b have a width of 14 mm, a height of 22 mm, and a thickness of 2.5 mm. The entirety of the housing 301 is covered by a cover 302 of PBT fabrication.

Structure of a bearing portion 303 will be described next.

Groove-shaped bearing portions 303 are disposed respectively on upper ends of the two side plates 301b, and two end portions of a shaft 304 are supported respectively on these bearing portions 303. As shown in the enlarged view of a bearing portion of FIG. 30, a Y-shaped (i.e., the head configuration of a plate screw) press-fitting path 303a is formed on the bearing portions 303 from an upper-end portion of the side plate 301b toward the base 301a. The press-fitting path 303a is formed into a bottomed (an inner surface of the side plate 301b corresponding to a bottom) groove configuration, and is composed of an open portion 303b of a side on which the shaft 304 is press-fitted, a narrow-diameter portion 303c, and a journal portion 303d of circular configuration. According to the present embodiment, maximum open width L1 of the open portion 303b is 2 mm, width L2 of the narrow-diameter portion 303c is 0.8 mm, and diameter φ of the support portion 303d is 1 mm.

Because the width L2 of the narrow-diameter portion 303c is formed to be shorter than the diameter of the shaft 304 in this way, the narrow-diameter portion 303c is expanded by elastic deformation of the PBT to the outer side (i.e., the direction of expanding the open portion 303b) when the shaft 304 is press-fitted, and is restored to its original position when the shaft 304 is housed in the journal portion 303d. That is to say, in a state where the shaft 304 is housed in the support portion 303d, the width L2 of the press-fit portion 303c is shorter than the diameter φ of the shaft 304 (L2<φ, and so dislodgement of the shaft 304 from the narrow-diameter portion 303c can be prevented.

As an incidental comment, when the two ends of the shaft 304 are merely press-fitted respectively from the upper end portions of the two side plates 301b, the side plates 301b are of synthetic resin fabrication, and so the shaft 304 can not prevent the side plates 301b from falling in to an inner side due to contraction of the cooling process after molding and the end surfaces of the rotor 307 and the side plates 301b come into contact, and so compactness of the device cannot be promoted because the gap between the end surfaces of the rotor 307 and the side plates 301b must be large.

Figure 30:
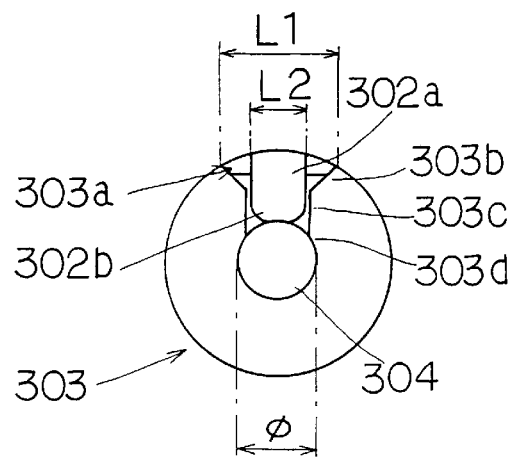
FIG. 30 is an enlarged view of a bearing portion.

In this regard, as shown in FIG. 29, this acceleration detecting device 300 prevents fall-in toward inner sides of the side plates 301b by causing the two ends of the shaft 304 to respectively contact bottom surfaces (inner surfaces of the side plated in the axial direction) 301c and 301c within the support portions 303d and 303d (see FIG. 30).

Consequently, because distance of the gap between the side plates 301b and the rotor 307 can be adjusted by overall length of the shaft 304, the shaft 304 can make the gap between the side plates 301d and rotor 307 smaller, and so compactness of the device can be promoted. Strength of the device can also be improved.

According to experimentation by the inventors, the distance of the gap was reduced to a limit of 0.1 mm when the two ends of the shaft 304 were merely supported, but by utilization of the above-described structure, the distance of the gap can be reduced to 0.05 mm in a state where the side plates 301d and the rotor 307 do not make contact, and so further compactness of the device was possible.

Additionally, dislodgement-preventing members 302a of convex configuration are formed at positions corresponding to the respective bearing portions 303 of a rear surface of the cover 302 upper surface tip portions 302b of these dislodgement-preventing members 302a are inserted within the narrow-diameter portions 303c of the bearing portion 303 and contact an upper surface of the shaft 304, and dislodgement to an upper area of the shaft 304 is promoted thereby. According to the present embodiment, the shaft 304 is a diameter of 1 mm and is formed of SUS 304 stainless steel. In addition, the thickness (i.e., a width corresponding to L2 in FIG. 30) of the tip portions of the dislodgement-preventing members 302a is 0.7 mm according to the present embodiment.

Structure of the rotor 307 inserted and fixed to the shaft 304 will be described next.

The rotor 307 is structured by molding the cam 305 to the weight 306. The rotor 307 is structured so as to rotate in the clockwise direction in FIG. 28 with the shaft 304 as the rotational center when subjected to acceleration from the direction of arrow A in FIG. 28. According to the present embodiment, the rotor 307 is formed of copper, and the cam 305 is formed by molding PBT on the surface of the copper.

A pair of plate springs 308 and 309 are mounted on the base 301a of the housing 301 in a form where lower ends thereof are embedded within the base 301a. A uniform gap is placed between the two plate springs 308 and 309, one plate spring 308 contacts a first cam portion 305a of the cam 305, and the other plate spring 309 contacts a second cam portion 305b. A contact point 309a of convex configuration is flexibly formed on the plate spring 309. The two plate springs 308 and 309 respectively contact the cams 305a and 305b so as to urge the rotor 307 in a direction opposite (a counterclockwise direction in FIG. 28) to a direction of rotation during a vehicle collision, and are such that the rotor 307 does not rotate even if the vehicle decelerates during travel and slight acceleration is received.

Terminals 310 and 311 of copper fabrication and respectively conducted with the plate springs 308 and 309 are also embedded in the portion of the base 301a where the plate springs 308 and 309 are embedded. These terminals 310 and 311 are conducted to outside the base 301a, and are connected to a drive circuit 312 to drive a passenger protection apparatus.

Operation of an acceleration detecting device of the above-described structure will be described next.

When the acceleration detecting device 300 is subjected to acceleration (shock) from the direction indicated by arrow A in FIG. 28, the rotor 307 rotates in the clockwise direction in the drawing due to the law of inertia. The first cam portion 305a of the cam 305 lowers the plate spring 308 in the direction of the plate spring 309 due to this rotation, and the tip of the plate spring 308 contacts the contact point 309a of the plate spring 309. The plate springs 308 and 309 are electrically conducted by this contact, this conductance is detected by the drive circuit 312 via the terminals 310 and 311, and the drive circuit 312 is driven.

Materials forming the housing 301, shaft 304, rotor 307, plate springs 308 and 309, terminals 310 and 311, and so on are not exclusively limited to those of the above-described embodiment.

According to this acceleration detecting device 300, as described above, because a shaft which becomes a rotational center of the rotor 307 does not jiggle, accuracy of detecting acceleration can be improved and a gap between a side plate 301b and the rotor 307 can be made smaller, and so compactness of the device can be promoted.

A sixteenth embodiment of the present invention will be next described with reference to FIGS. 31 through 41.

Figure 31:
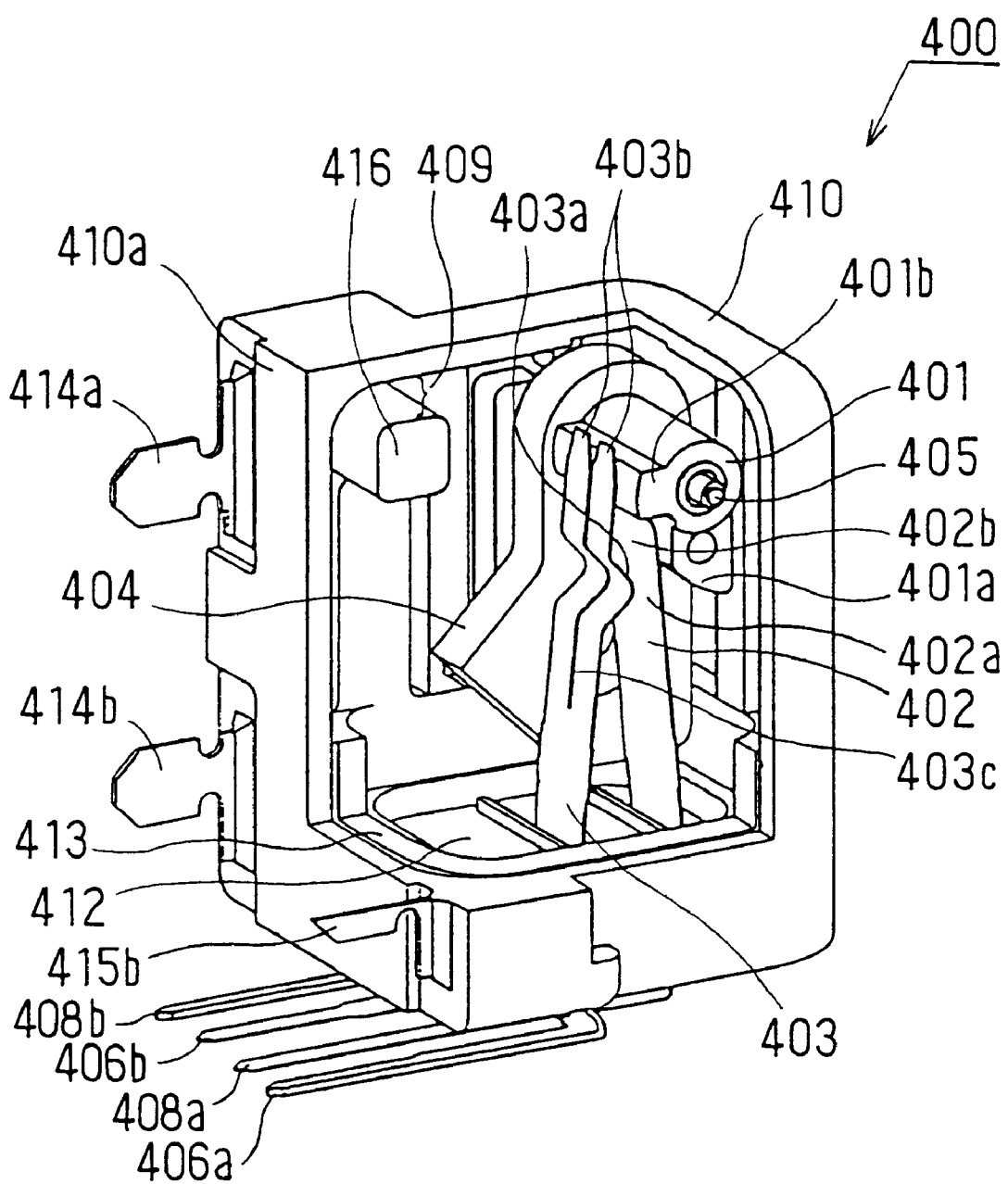
FIG. 31 is a perspective view indicating a structure of an acceleration detecting device according to sixteenth embodiment of the present invention.
Figure 32:
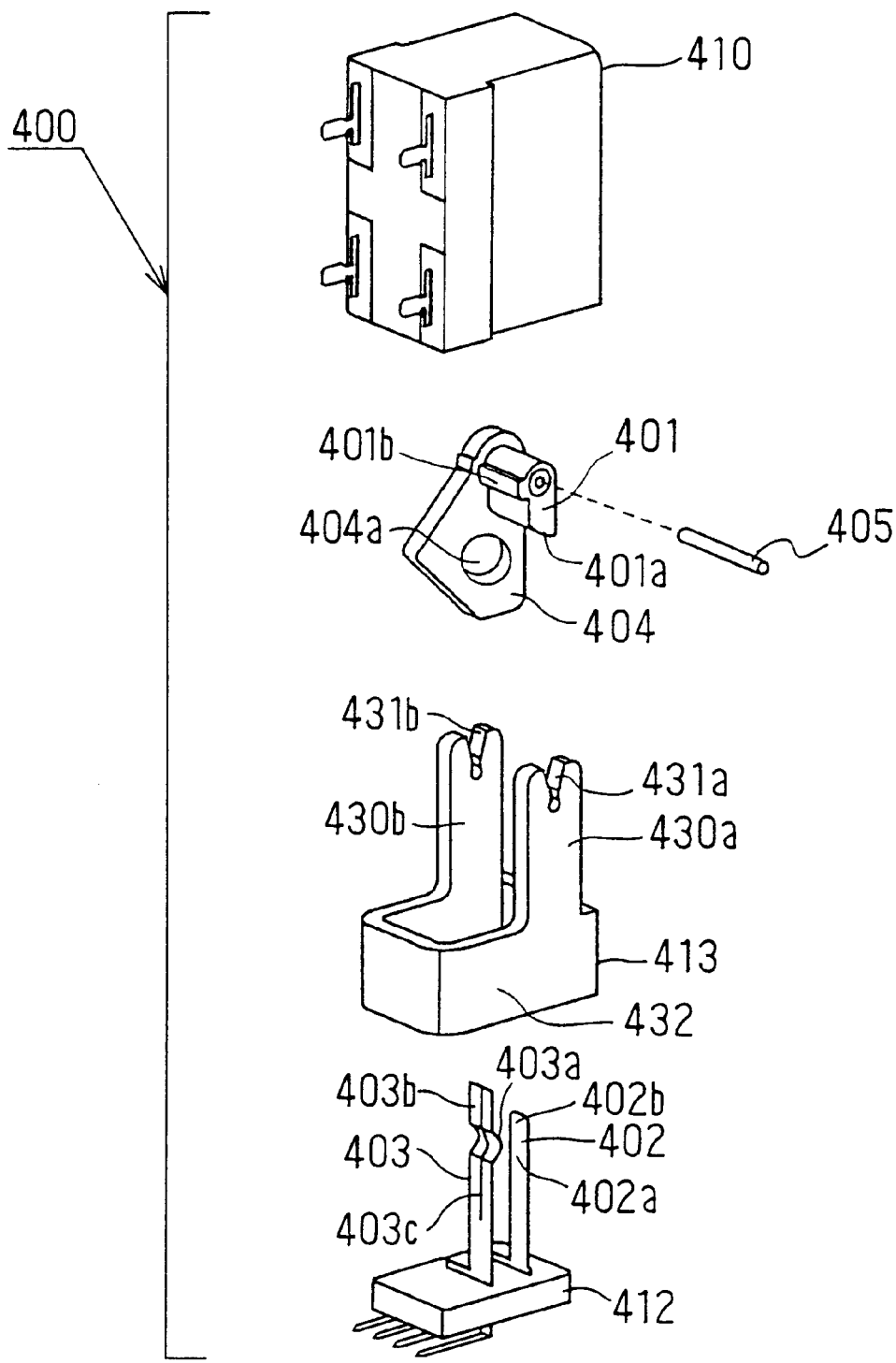
FIG. 32 is an exploded view indicating a state in assembling the acceleration detecting device according to the sixteenth embodiment.

FIG. 31 is a perspective view indicating a structure of an acceleration detecting device 400 according to sixteenth embodiment, FIG. 32 is an exploded view indicating a state in assembling the acceleration detecting device 400. The acceleration detecting device 400 includes a resinous cover 410 (corresponding to a protective member), a flat base 412 and a housing 413. The base 412 is press-fitted in the housing 413 and the housing 413 is press-fitted in the cover 410 so that the base 412 and the housing 413 are fixed to the cover 410.

As shown in FIG. 32, the housing 413 includes a base portion 432 and a pair of pillar portions 430a and 430b opposing to each other. Groove portions 431a and 431b are respectively formed at top portions of the pillar portions 430a and 430b. By the groove portions 431a and 431b, two ends of a shaft 405 are mechanically fixed. A weight 404 where a weight center of gravity and a rotational center are not co-axial is rotatably attached to the shaft 405.

The weight 404 is formed by performing mechanical process to a metal plate, and a hole 404a penetrating through the weight 404 is formed in the weight 404 to adjust weight or the gravity center of the weight 404. A rotor 401 is fixed to an upper portion of the weight 404 by a resinous molding method so that the weight 404 and the rotor 401 are rotated around the identical shaft 405. Further, the rotor 401 has a first cam 401a and a second cam 401b.

A pair of plate springs 402 and 403 respectively having contact point 402a and 403a at the upper portions thereof are erected on the base 412 to have a predetermined distance therebetween. The contact point 402a is a flat surface and the contact point 403a is formed to protrude to a side of the contact point 402a. Tip portions 402b and 403b of the plate springs 402 and 403 contact respectively the surfaces of the first cam 401a and the second cam 401b of the rotor 401, and the plate springs 402 and 403 elastically urge the weight in a direction opposite to a rotation direction of the weight 404 and the rotor 401 based on the application of acceleration. Thus, when the acceleration detecting device 400 is mounted on a vehicle to detect acceleration corresponding to a vehicle collision, the weight 404 and the rotor 401 are not rotated by a slight acceleration caused during a quick brake of the vehicle or traveling of the vehicle on a bumpy road.

A slit 403c is formed in the plate spring 403 from an approximately center portion to the tip portion 403b in a longitudinal direction, so that the tip portion 403b is separated to two parts. By the slit 403c, the contact point 402a and the contact point 403a favorably contact.

The plate springs 402 and 403 respectively contact signal-output terminals 408a and 408b and signal-output terminals 406a and 406b, and are fixed in the base 412. Seal members 411 (refer to FIG. 33) are formed on the rear face of the base 412 to seal the acceleration detecting device 400. The signal-output terminals 406a, 406b, 408a and 408b protrude from the bottoms of the seal members 411 to outside. During a vehicle collision, the contact between the contact points 402a and 403a can be detected as an acceleration detecting signal through the terminals 406a, 406b, 408a and 408b.

A square-pole shaped stopper 416 (corresponding to regulation means) is disposed at a rotation passage of the weight 404. The stopper 416 is composed of an elastic resin such as EPDM (i.e., ethylene-propylene trimmer), the two end of the stopper 416 are fixed on the cover 410 by press-fitting the stopper 416 into the cover 410. The thickness of the cover 410 opposite to the stopper 416 in the rotation direction of the weight 404 is reduced, so that a clearance portion (i.e., space) 409 is formed between the stopper 416 and the cover 410. When the weight 404 rotates, the weight 404 contacts the stopper 416, and therefore, the rotation of the weight 404 more than a predetermined angle is regulated by the stopper 416.

Figure 33A:
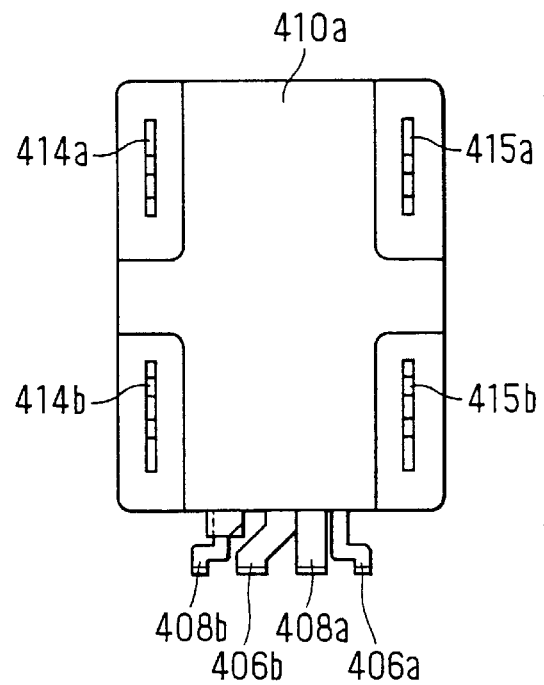
FIGS. 33A, 33B and 33C are a front view, a side view and a bottom view, respectively, indicating the acceleration detecting device according to the sixteenth embodiment.

As shown in FIG. 33A, on an installation surface 410a of the cover 410, fixed terminals 414a, 414b, 415a and 415b are fixed by resinous insert-formation. By the fixed terminals 414a, 414b, 415a and 415b, the acceleration detecting device 400 is fixed in a circuit substrate (not shown) or the like. The fixed terminals 414a and 414b as well as the fixed terminals 415a and 415b are formed integrally by performing mechanical process of insert plates 414 and 415 described later.

Figure 33B:
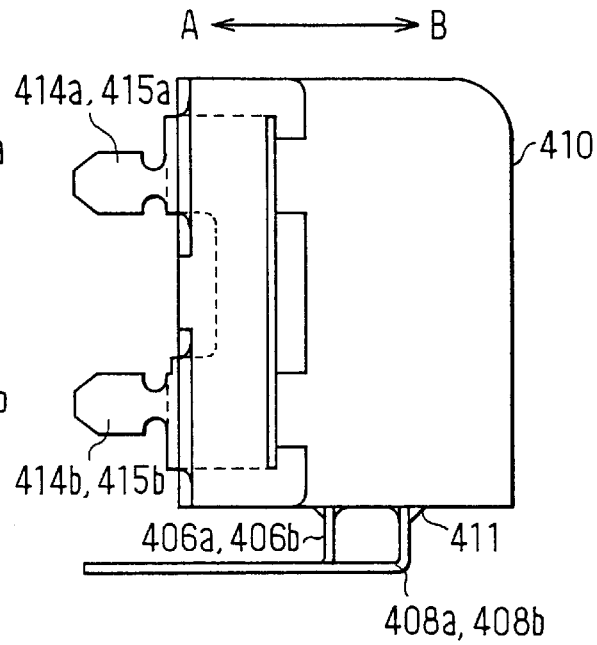
Figure 33C:
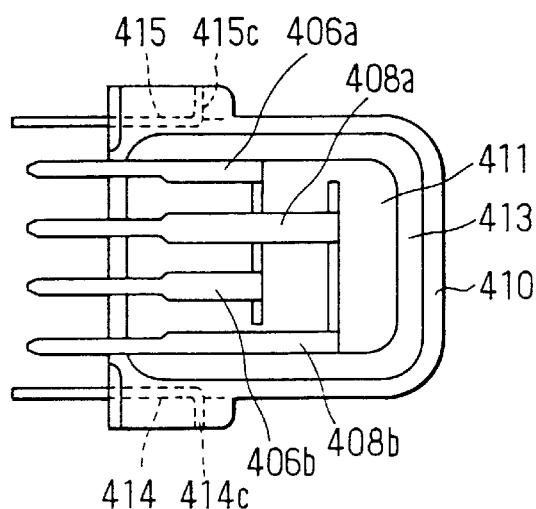

FIGS. 33A, 33B and 33C are a front view, a side view and a bottom view, respectively, indicating the acceleration detecting device 400. In FIG. 33B, direction A shows a direction of a vehicle collision.

The insert plates 414 and 415 are located at two sides of the installation surface 410a to arrange the fixed terminals 414a, 414b, 415a and 415b at the four corners of the installation surface 410a. In the insert plates 414 and 415, bent portions 414c and 415c are respectively formed at the end portions opposite to the fixed terminals 414a, 414b, 415a and 415b in a predetermined angle (e.g., an approximately right angle as shown in FIG. 33C).

Figure 39A:
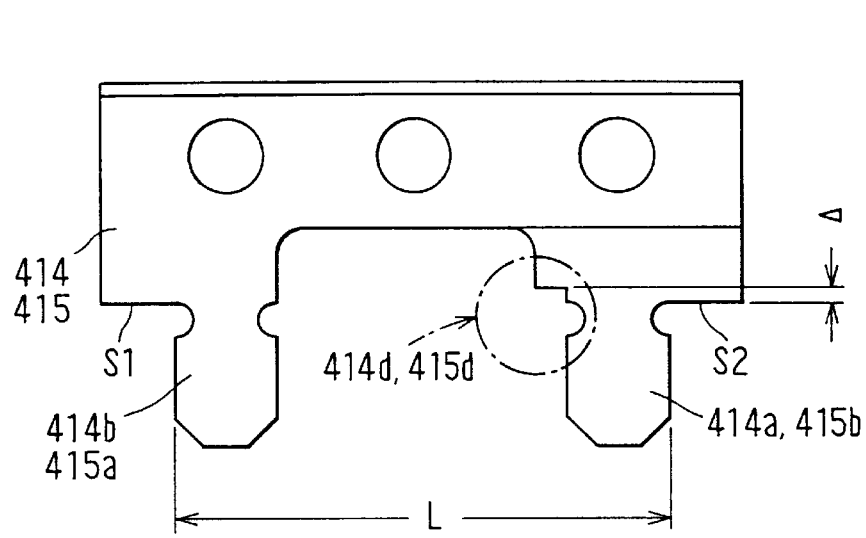
FIGS. 39A and 39B are a front view and a side view, respectively, indicating an insert plate of the acceleration detecting device according to the sixteenth embodiment.
Figure 39B:
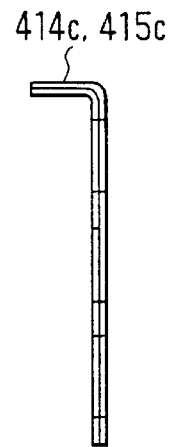

FIGS. 39A and 39B are a front view and a side view, respectively, indicating the insert plates 414 and 415. As shown in FIGS. 39A and 39B, unsymmetric-shaped portions 414d and 415d are formed at the roots of the fixed terminals 414a and 415b disposed diagonally on the installation surface 410a to prevent an erroneous arrangement of the insert plates 414 and 415.

Further, as shown in FIG. 33C, because the seal members 411 are formed around the signal-output terminals 406a, 406b, 408a and 408b, the acceleration detecting device 400 can be accurately sealed.

Next, the operation of the acceleration detecting device 400 will be described.

Figure 34A:
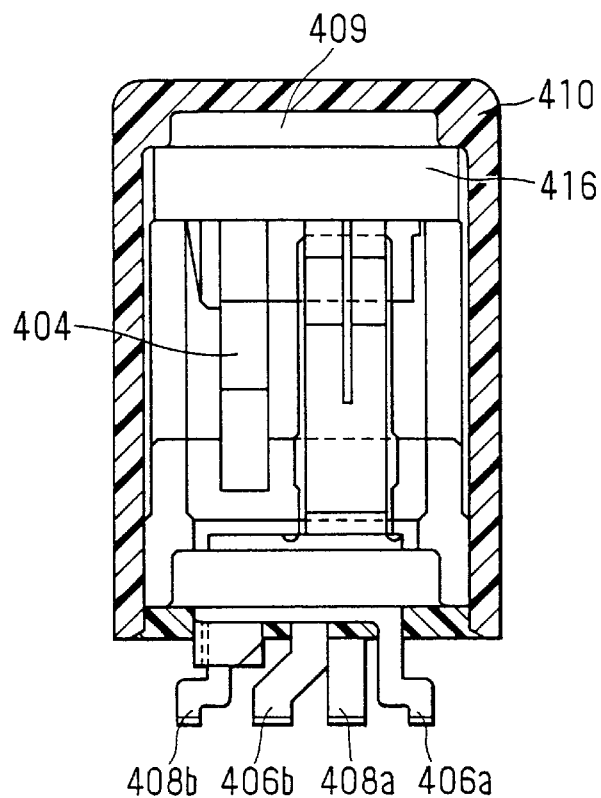
FIGS. 34A and 34B are a front-section view and a side-sectional view, respectively, indicating the acceleration detecting device according to the sixteenth embodiment in which an acceleration less than a predetermined level is applied.
Figure 34B:
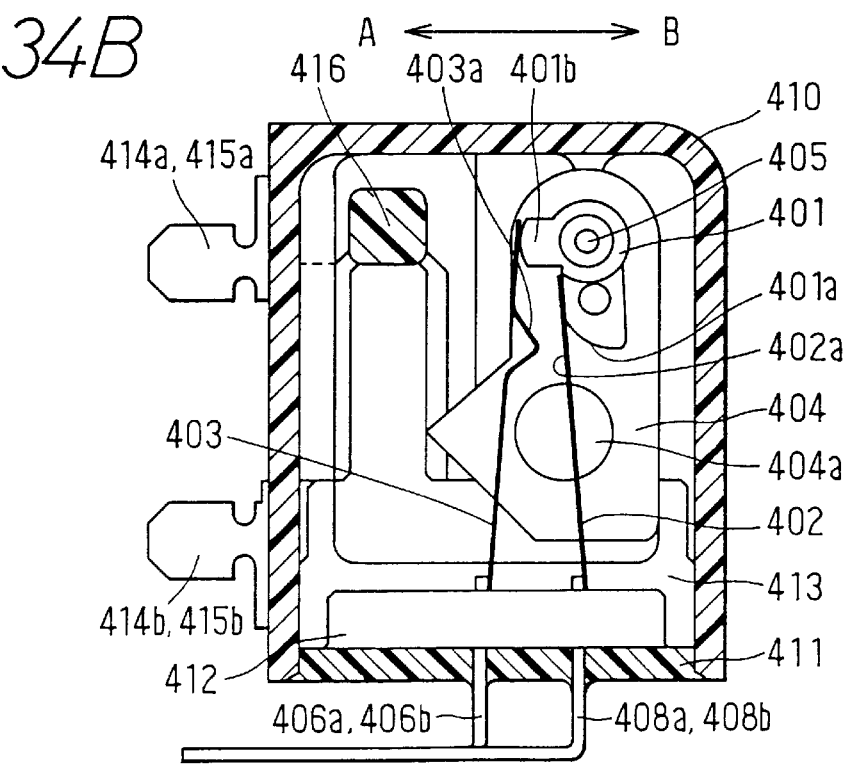

FIGS. 34A and 34B are a front-sectional view and a side-sectional view, respectively, indicating the acceleration detecting device 400 in which an acceleration less than a specified level is applied to the weight 404 so as not to contact the contact points 402a and 403a with each other (i.e., "OFF" state).

In the "OFF" state, the rotor 401 is elastically urged in the B direction in FIG. 34B by the plate springs 402 and 403, and the weight 404 integrated with the rotor 401 is also urged in the B direction in FIG. 34 relative to the housing 413.

Figure 35A:
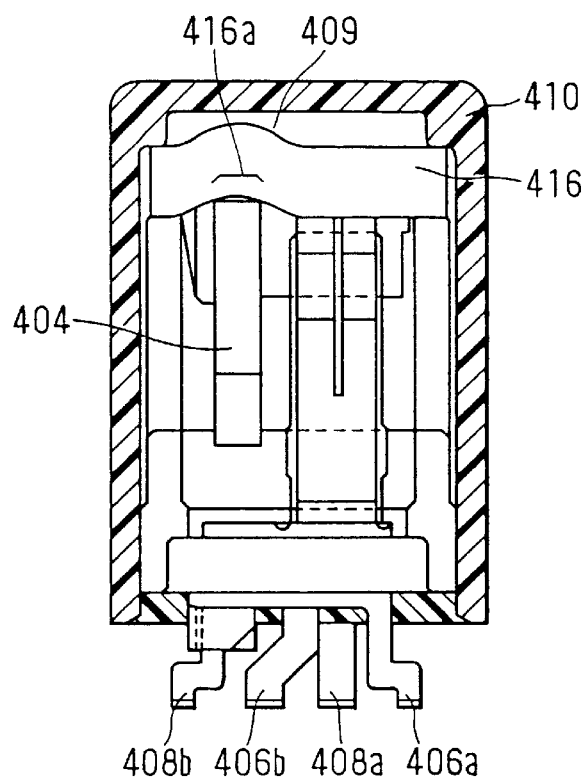
Figure 35B:
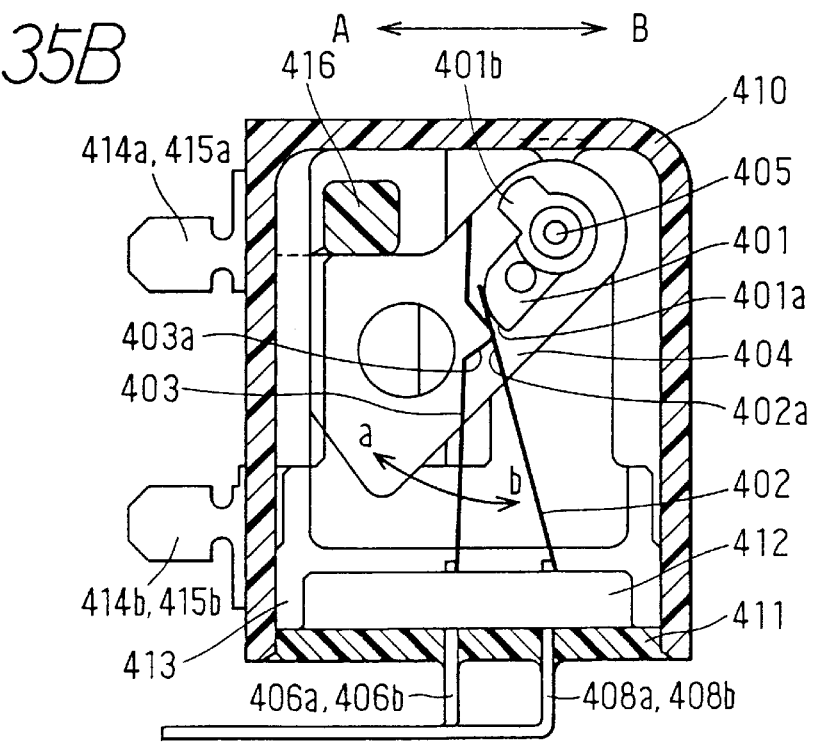

FIGS. 35A and 35B are a front-sectional view and a side-sectional view, respectively, indicating the acceleration detecting device 400 in which an acceleration more than a specified level is applied to the weight 404 in the A direction to contact the contact points 402a and 403a with each other (i.e., "ON" state).

When an acceleration more than the specified level is applied to the weight 404 in the A direction, a rotational moment is applied to the center of gravity of the weight 404, and therefore, the weight 404 and the rotor 401 rotate around the shaft 405 toward the A direction in FIG. 35B to be opposite to the elastic force urged by the plate springs 402 and 404. Further, the weight 404 contacts the stopper 416 so that the rotation of the weight 404 and the rotor 401 is regulated. At this time, with the rotation of the rotor 401, the plate springs 402 and 403 contacting respectively the first cam 401a and the second cam 401b move so as to narrow the clearance between the plate springs 402 and 403. When the rotor 401 rotates to a predetermined angle, the contact points 402a and 403a of the plate springs 402 and 403 contact, and the contact state can be detected as an acceleration detecting signal based on the variation in electric current taken out of the signal-output terminals 406a, 406b, 408a and 408b.

Figure 36:
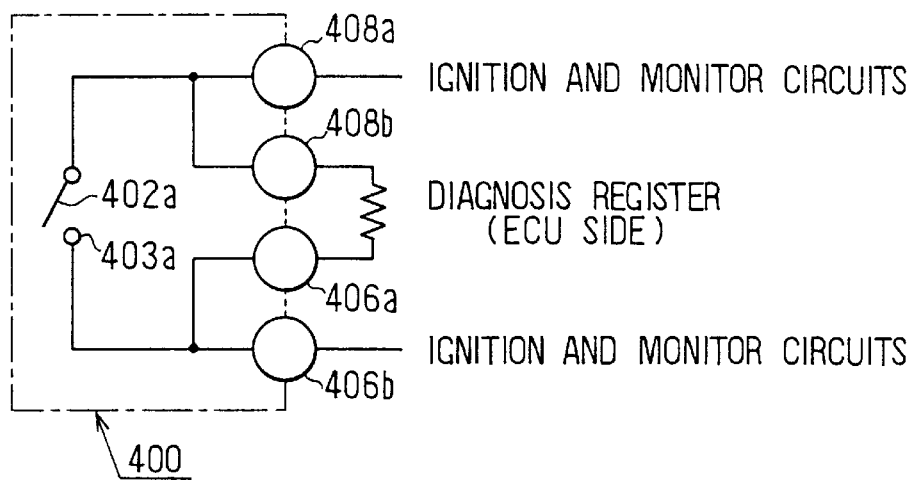
FIG. 36 is a circuit diagram of the acceleration detecting device according to the sixteenth embodiment.
Figure 37:
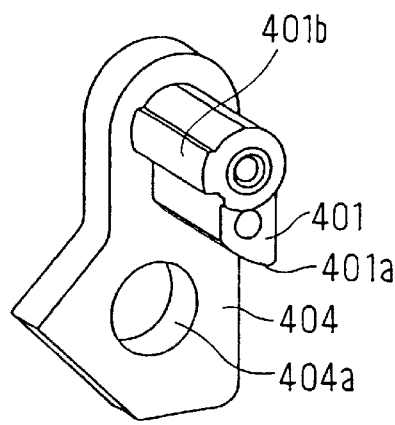
FIG. 37 is a perspective view indicating a rotor and a weight of the acceleration detecting device according to the sixteenth embodiment.

FIG. 36 is a circuit diagram of the acceleration detecting device 400. As shown in FIG. 36, an acceleration detecting signal is output to an ignition circuit and a monitor circuit (not shown) through the output terminals 406b and 408a, and the detecting signal is output to a diagnosis register at ECU side (not shown) through the output terminals 406a and 408b.

When the stopper 416 contacts the weight 404, the stopper 416 around a contact portion 416a is bent at a side of the clearance portion 409. Thus, kinetic energy due to the rotation of the weight 404 is changed to elastic energy of the stopper 416. That is, the stopper 416 acts as a damper when the stopper 416 and the weight 404 contact, and the shock of the weight 404 is absorbed in the stopper 416.

In the sixteenth embodiment, the clearance portion 409 is formed between the stopper 416 and the cover 410. The stopper 416 is bent to increase the damper operation when the weight 404 contacts the stopper 416. Therefore, the chattering between the contact points 402a and 403a can be prevented when the weight 404 and stopper 416 contact, and a time period of maintaining contact thereof can be increased so that the acceleration detecting signal can be stably output.

In the above-described structure of the sixteenth embodiment, the time period of maintaining contact of the contact points 402a and 403a can increase about 1.3 times as compared with a structure without the clearance portion 409 between the stopper 416 and the cover 410.

Further, by forming the hole 404a in the weight 404, weight or the gravity center of the weight 404 is easily adjusted. Thus, the sensibility characteristic of the acceleration detecting device 400 can be controlled without changing the shape of the weight 404.

Figure 38:
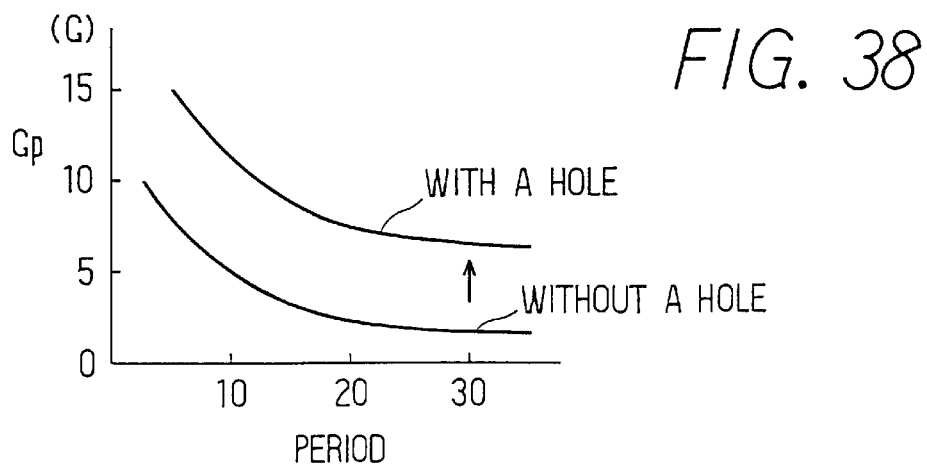
FIG. 38 is a graph showing the relationship between an acceleration value and a period of acceleration signal according to the sixteenth embodiment.

FIG. 38 is a graph showing the relationship between an acceleration value (G) and a period (ms) of acceleration wave and curved lines show operation level for contacting. As shown in FIG. 38, by forming the hole 404a in the weight 404, the operation level for contacting can be made large. For example, in a vehicle side-collision, the acceleration acting to the weight 404 is in a high frequency and the acceleration itself is higher as compared with a vehicle front-collision. Therefore, by forming a hole in the weight of the acceleration detecting device for a vehicle front-collision, a weight for a vehicle side-collision can be easily formed.

Further, because the shape of the weight 404 does not need to change, a common resin mold can be used, and there is a merit to manufacture the acceleration detecting device 400 in low cost.

According to the sixteenth embodiment, the bent portions 414c and 415c are respectively formed in the insert plates 414 and 415. Therefore, the insert plates 414 and 415 have an increased flexural strength in the thickness direction thereof. As a result, the insert plates 414 and 415 can be fixed to the thinned resin member by a resin insert formation.

Figure 40A:
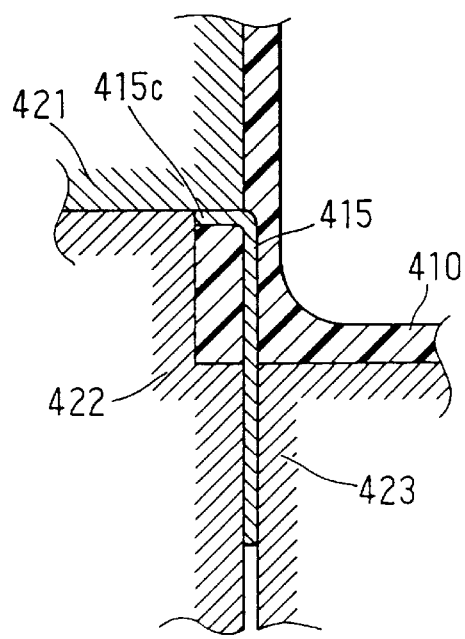
FIGS. 40A and 40B are diagrammatic views indicating a state of resin insert-formation of the insert plate when the insert plate has a bent portion and when the insert plate does not have the bent portion.
Figure 40B:
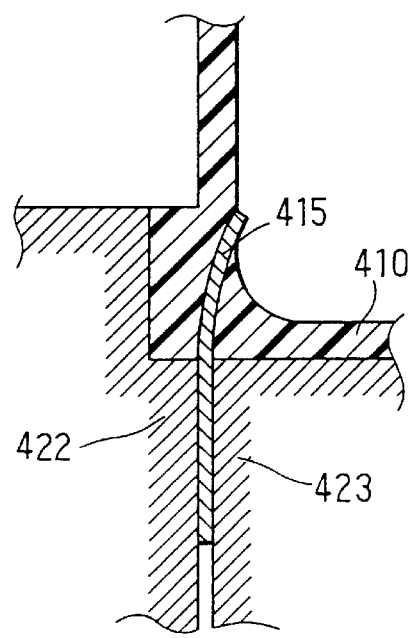

FIG. 40B is a diagrammatic view indicating a state of resin insert-formation of the insert plate 415 without the bent portion 415c. Because the bent portion 415c is not formed in the insert plate 415, the inserted tip portion of the insert plate 415 inclines in the right or left direction of FIG. 40B, and the insert plate 415 can protrude from the inner surface of the cover 410 as shown in FIG. 40B.

As shown in FIG. 40A, when the bent portion 415c is formed in the insert plate 415, the flexural strength of the insert plate 415 is increased, and therefore, the left-right inclined degree of the plate 415 can be decreased during the insert formation, and the plate 415 can be fixed by the dies 421 and 422. Thus, during the resin insert-formation, the insert plate 415 can be accurately fixed at a predetermined position to have a predetermined shape.

Thus, In the sixteenth embodiment, it is possible to perform insert formation of a thin plate in a thin resin and to seal the acceleration detecting device 400 sufficiency. Further, because the inserted position and state of the insert plate 414 can be confirmed from the appearance, the quality control of the insert plate 415 is readily performed.

Further, as shown in FIGS. 39A and 39B, because unsymmetric-shaped portions 414d and 415d are respectively formed in the insert plates 414 and 415, an erroneous arrangement of the insert plates 414 and 415 is prevented.

Figure 41A:
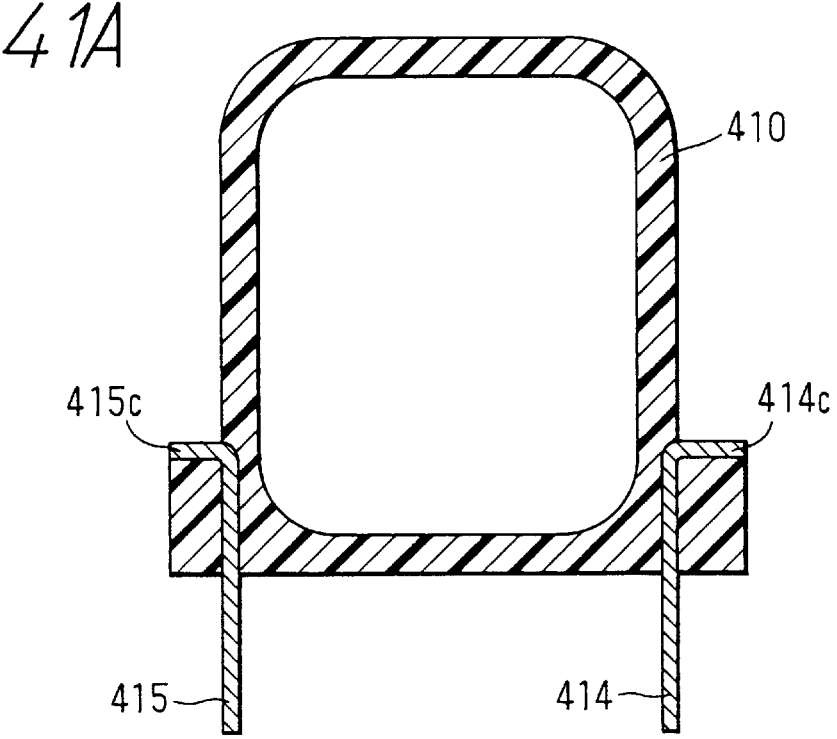
FIGS. 41A and 41B are diagrammatic views indicating a result of resin insert-formation of the insert plate when the insert plate has an unsymmetric-shaped portion and when the insert plate does not have the unsymmetric-shaped portion.
Figure 41B:
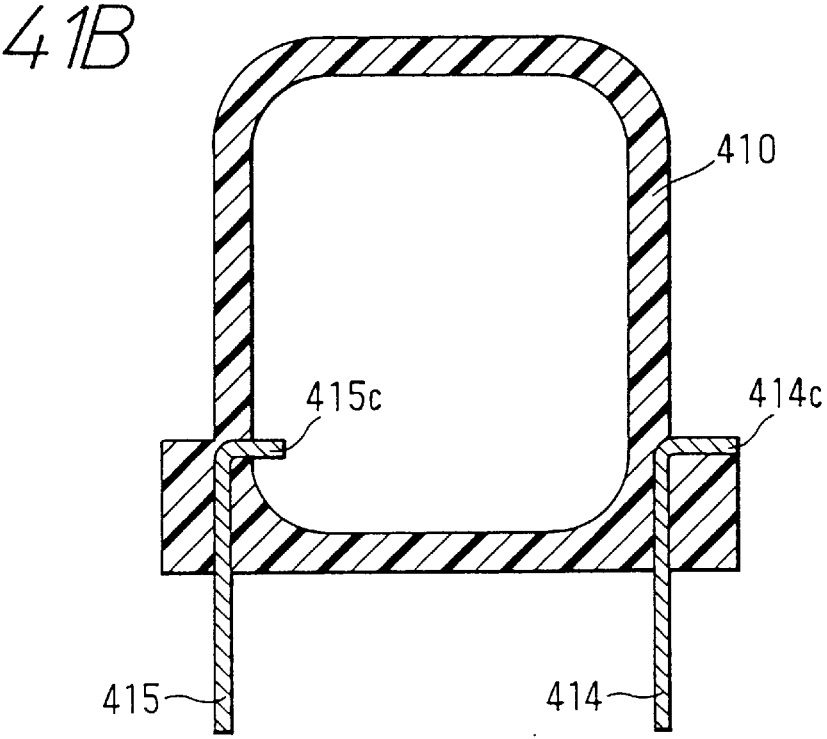

As shown in FIG. 41B, when the insert plates 414 and 415 are arranged so that each bent portion faces the right side in FIG. 41B, the bent portion 415c protrudes from the inner surface of the cover 410. Depending on the arrangement of the insert plates 414 and 415, one of the bent portions 414c and 415c or both of the bent portions 414c and 415c can protrude from the inner surface of the cover 410. However, in the sixteenth embodiment, the unsymmetric-shaped portions 414d and 415d formed in the insert plates 414 and 415 are used as marks, and the insert plates 414 and 415 are disposed in the die 422. Therefore, the insert plates 414 and 415 can be accurately disposed as shown in FIG. 41A, and it can prevent a defective product.

Further, when the insert plates 414 and 415 are disposed as shown in FIG. 41B, the bent portion 415c of the insert plate 415 interferes on a center die for forming the inside shape of the cover 410, and therefore, it is possible to give a damage to the center die. However, in the sixteenth embodiment, because there is no interference between the insert plate 415 and the center die as shown in FIG. 41A, damage to the center die can be prevented.

Further, the unsymmetric-shaped portions 414d and 415d are respectively formed at the inside of the roots of the fixed terminals 414a and 415b, and are further cut by Δ shown in FIG. 39A from an end surface which contacts a substrate when the acceleration detecting device 400 is disposed in the substrate (not shown). As a result, end surfaces S1 and S2 formed at the outer sides of the roots of the fixed terminals 414a and 415b are in contact with the substrate. As a result, the distance L between the end surfaces S1 and S2 can be made longer, and the acceleration detecting device 400 can be stably installed on the substrate.

In FIG. 39A, the unsymmetric-shaped portions 414d and 415d are respectively formed at the roots of the fixed terminals 414a and 415b. However, the unsymmetric-shaped portions 414d and 415d may be formed at top ends of the fixed terminals 414a and 415b. Further, the unsymmetric-shaped portions 414d and 415d are respectively formed at the roots of the fixed terminals 414a and 415b disposed diagonally on the installation surface 410a, however, they may be formed at roots of another fixed terminals 414b and 415a disposed diagonally on the installation surface 410a. If only the arrangement direction of the insert plates 414 and 415 can be clearly understood, the other shape and the other forming position of the unsymmetric portions 414d and 415d can be used.

In the sixteenth embodiment, the stopper 416 has a square-pole shape. However, the stopper 416 may be formed in a plate shape or a cylindrical shape.

In the sixteenth embodiment, the stopper 416 is made of EPDM. However, the stopper 416 may be made of the other resin having elastic performance. Further, the stopper 416 may be composed of the other elastic member such as spring coil or plate spring.

In the sixteenth embodiment, the two ends of the stopper 416 are fixed in the cover 410. However, the stopper 416 may be fixed in the housing 413 or the other members.

In the sixteenth embodiment, by reducing the thickness of the cover 410, the clearance portion 409 between the cover 410 and the stopper 416 is formed. However, the clearance portion 409 may be formed by reducing the thickness of the stopper 416 or changing the shape of the stopper 416 or the like.

In the sixteenth embodiment, to readily form the hole 404a in the weight 404, the hole 404a is formed in a round shape. However, the hole 404a may have a square shape or a triangular shape. Further, the hole 404a may not be penetrated through the weight 404.

Further, the contact points 402a and 403a are normally opened and are closed when an acceleration more than a predetermined value is applied. However, the contact points may be normally closed and be opened when an acceleration more than a predetermined value is applied.

In the sixteenth embodiment, the contact points 402a and 403a are respectively formed integrally with the plate springs 402 and 403. However, the contact points may be separated from the plate springs, and may be operatively linked with the plate springs. Further, the contact points may be operated by a general mechanism, for example, a link mechanism, in which the state of the contact points is changed in accompaniment for the rotation of the rotor.

Further, the weight 404 and the rotor 401 are rotatably supported around the shaft 405. However, the weight 404 and the rotor 401 are fixed to the shaft 405, a bearing is formed in the housing 413, and the shaft 405 may be rotatably supported in the bearing.

According to the sixteenth embodiment, when the weight 404 contacts the stopper 416, the stopper 416 is bent and absorbs the shock due to the rotation of the weight 404. Therefore, it can prevent chattering between the contact points 402*a* and 403*a*, a time period of maintaining contact of the contact points can be made longer, and a stable acceleration detecting signal can be provided.

What is claimed is:

1. An acceleration detecting device comprising:

a weight to rotate in correspondence with acceleration;

a shaft which is fixed to said weight and becomes a rotational center when said weight rotates;

a rotor which includes a cam portion and is supported in said shaft to rotate integrally with said weight;

a pair of plate springs of which a contact state changes in an actuating state when said rotor rotates by a predetermined angle;

a housing for fixing said shaft and said pair of plate springs;

a cover installed on said housing for covering said shaft and said pair of plate springs fixed to said housing; and an shock-reducing member for regulating a further rotation of said weight after said contact state of said plate springs becomes in said actuating state and for elongating said actuating state, which is fixed to at least one of said housing and said cover and is disposed in a rotation passage of said weight to absorb a shock due to a rotational energy of said weight, wherein said shock reducing member is an elastic member which absorbs the shock due to the rotational energy of said weight by deforming during contact with said weight, and wherein said elastic member has opposite two ends, and said two ends of said elastic member are fixed to said cover or said housing to have a space for bending said elastic member when said weight and said elastic member contact.

2. An acceleration detecting device according to claim 1, wherein said elastic member has a cylindrical shape or a square-pole shape.

3. An acceleration detecting device according to claim 1, wherein said elastic member has a plate shape that is formed integrally with said cover.

4. An acceleration detecting device according to claim 1, wherein said weight has a hole formed thereon.

5. An acceleration detecting device according to claim 4, wherein said hole penetrates through said weight.

6. An acceleration detecting device according to claim 4, wherein said hole has a round shape.

7. An acceleration detecting device according to claim 1, wherein said space for bending said elastic member is formed by reducing a thickness of said cover.

8. An acceleration detecting device comprising:

a weight to rotate in correspondence with acceleration;

a shaft which is fixed to said weight and becomes a rotational center when said weight rotates;

a rotor which includes a cam portion and is supported in said shaft to rotate integrally with said weight;

a pair of plate springs of which a contact state changes in an actuating state when said rotor rotates by a predetermined angle;

a housing for fixing said shaft and said pair of plate springs;

a cover installed on said housing for covering said shaft and said pair of plate springs fixed to said housing; and an shock-reducing member for regulating a further rotation of said weight after said contact state of said plate springs becomes in said actuating state and for elongating said actuating state, which is fixed to at least one of said housing and said cover and is disposed in a rotation passage of said weight to absorb a shock due to a rotational energy of said weight, wherein said elastic member is composed of a coil spring or a plate spring.

9. An acceleration detecting device comprising:

a weight to rotate in correspondence with acceleration;

a shaft which is fixed to said weight and becomes a rotational center when said weight rotates;

a rotor which includes a cam portion and is supported in said shaft to rotate integrally with said weight;

a pair of plate springs of which a contact state changes in an actuating state when said rotor rotates by a predetermined angle;

a housing for fixing said shaft and said pair of plate springs;

a cover installed on said housing for covering said shaft and said pair of plate springs fixed to said housing; and an shock-reducing member for regulating a further rotation of said weight after said contact state of said plate springs becomes in said actuating state and for elongating said actuating state, which is fixed to at least one of said housing and said cover and is disposed in a rotation passage of said weight to absorb a shock due to a rotational energy of said weight, wherein said pair of plate springs are disposed with a predetermined clearance interposed therebetween and respectively have tip portions, at least one of said tip portion of said plate springs contacts said cam portion of said rotor for urging said rotor in a direction opposite to a direction of rotation of said rotor, and said contact state becomes in said actuating state by rotation of said rotor when a predetermined acceleration is applied to said weight.

10. An acceleration detecting device according to claim 9, wherein said cam portion of said rotor includes a first cam portion and a second cam portion, said first and second plate springs respectively contact said first cam portion and said second cam portion, and said first and second cam portions are disposed to contact said first plate spring and second plate spring when said predetermined acceleration is applied to weight.

* * * * *

UNITED STATES PATENT AND TRADEMARK OFFICE
CERTIFICATE OF CORRECTION

PATENT NO. : 5,914,470
DATED : June 22, 1999
INVENTOR(S) : SUZUKI et al.

It is certified that error appears in the above-identified patent and that said Letters Patent is hereby corrected as shown below:

On the title page:

Please change:

[63] "Continuation-in-part of application No. 08/496,199, Jun. 28, 1995, Pat. No. 5,721,407"
to
--Continuation-in-part of application No. 08/496,199, Jun. 28, 1995, Pat. No. 5,920,045--

[30]   Foreign Application Priority Data

Please change:   "Feb. 19, 1995" to --Feb. 23, 1995--

"Mar. 19, 1995" to --Mar. 1, 1995--

Signed and Sealed this

Nineteenth Day of September, 2000

Attest:

Q. TODD DICKINSON

*Attesting Officer*       Director of Patents and Trademarks